United States Patent
Kurokawa et al.

(10) Patent No.: US 9,281,742 B2
(45) Date of Patent: Mar. 8, 2016

(54) CONTROL DEVICE FOR A POWER CONVERTER CIRCUIT

(71) Applicants: Nagasaki University, Nagasaki-shi, Nagasaki (JP); PANASONIC CORPORATION, Kadoma-shi, Osaka (JP)

(72) Inventors: Fujio Kurokawa, Nagasaki (JP); Masahito Ohnishi, Kadoma (JP)

(73) Assignees: NAGASAKI UNIVERSITY, Nagasaki-Shi, Nagasaki (JP); PANASONIC CORPORATION, Kadoma-Shi, Osaka (JP)

( * ) Notice: Subject to any disclaimer, the term of this patent is extended or adjusted under 35 U.S.C. 154(b) by 124 days.

(21) Appl. No.: 14/345,205
(22) PCT Filed: Sep. 18, 2012
(86) PCT No.: PCT/JP2012/073866
§ 371 (c)(1),
(2) Date: Mar. 14, 2014

(87) PCT Pub. No.: WO2013/039250
PCT Pub. Date: Mar. 21, 2013

(65) Prior Publication Data
US 2015/0003129 A1 Jan. 1, 2015

(30) Foreign Application Priority Data
Sep. 15, 2011 (JP) .................... 2011-202483

(51) Int. Cl.
- *H02M 1/00* (2007.01)
- *H02M 1/42* (2007.01)
- *H02M 3/157* (2006.01)
- *H02M 7/06* (2006.01)

(52) U.S. Cl.
CPC ............. *H02M 1/42* (2013.01); *H02M 1/4225* (2013.01); *H02M 3/157* (2013.01); *H02M 7/06* (2013.01); *H02M 2001/0022* (2013.01)

(58) Field of Classification Search
CPC ..... H02M 1/42; H02M 1/4225; H02M 1/156; H02M 1/157; H02M 1/158; H02M 2001/0019; H02M 2001/0022
See application file for complete search history.

(56) References Cited

U.S. PATENT DOCUMENTS

| | | | | |
|---|---|---|---|---|
| 8,248,041 B2* | 8/2012 | Rausch | ............... | H02M 1/4225 323/207 |
| 8,564,992 B2* | 10/2013 | Takahashi | ........... | H02M 1/4225 323/222 |
| 8,625,249 B2* | 1/2014 | Ooishi | .................. | H02M 3/156 361/139 |
| 2012/0161738 A1* | 6/2012 | Nakashima | ........... | H02M 3/158 323/284 |
| 2014/0253079 A1* | 9/2014 | Ding | .................... | H02M 3/156 323/283 |

FOREIGN PATENT DOCUMENTS

| JP | 2001-169553 | 6/2001 |
|---|---|---|
| JP | 2011-167040 | 8/2011 |

OTHER PUBLICATIONS

International Search Report for International Application No. PCT/JP2012/073866 dated Apr. 2, 2013.

* cited by examiner

*Primary Examiner* — Matthew Nguyen
(74) *Attorney, Agent, or Firm* — Kile Park Reed & Houtteman PLLC

(57) ABSTRACT

In DC/DC converter circuit, the peak value of the reactor current is found based on output voltage and an input voltage, thereby, the operation with the predetermined electric current mode is thereby enabled. The AC/DC converter circuit is run with a predetermined current mode, the power factor improvement is accomplished. The first control part 211 inputs a detected value of output voltage Eo, and a turn-off timing predicted value of switch Tr of the DC/DC converter 1 is calculated. The first control part 211 sends the calculation result to the switch drive signal generate part 213. The second control part 212 inputs the detected value of the output voltage and the input voltage, and it receives the turn-off timing predicted value from the first control part 211. Even more particularly, the second control part 212 calculates the peak value of the reactor current of the DC/DC converter 1 based on the turn-off timing predicted value, and it calculates the time that the reactor current decreases to a predetermined preset value from the peak value as a turn-on timing predicted value.

16 Claims, 23 Drawing Sheets

| Operation Status | $T_r$ | D |
|---|---|---|
| OS_1 | ON | OFF |
| OS_2 | OFF | ON |
| OS_3 | OFF | OFF |

(B)

| Operation Mode | Status Transition Sequence | $i_L$ |
|---|---|---|
| I | OS_1 → OS_2 | all time: $i_L \neq 0$ |
| II | OS_1 → OS_2 → OS_3 | Period $i_L \neq 0$, Period $i_L = 0$ are exist |
| III | OS_1 → OS_2 | Period $i_L \neq 0$ is exist, Period $i_L = 0$ is not exist $i_L = 0$ occur at a point. |

(A)

(B)

(A)

(B)

OS_1(T_r:ON  D:OFF)

(A)

(B)

(A)

(B)

(A)

(B)

(A)

(B)

Resolution of A/D converter (A)

(B)

(A)

(B)

CONTROL DEVICE FOR A POWER CONVERTER CIRCUIT

FIELD OF THE INVENTION

The present invention relates to a control device for a power converter circuit which can reduce an electric power consumption and a control device for a power converter circuit which can improve a power factor.

Specifically, the present invention relates to a control device for a power converter circuit which performs a DC/DC conversion or an AC/DC conversion; wherein the control device detects a peak value of current which flows through a reactor, predicts a time when the current decreased to a predetermined value from the peak value by operation, and turns on a power switch.

BACKGROUND ART

FIG. 21 (A) shows a DC/DC converter 91 of a step-up and -down type which runs with a current critical mode, and it shows a control device 92.

The DC/DC converter 91 consists of a power supply PSDC (it generates an input voltage Ei of the direct current), a transistor switch Tr, a reactor L, a diode D and a capacitor C.

One terminal of the power supply PSDC is connected to one terminal of the transistor switch Tr.

Another terminal of the transistor switch Tr is connected to one terminal of the reactor L and a cathode terminal of the diode D.

Another terminal of reactor L is grounded.

An anode terminal of the diode D is connected to one terminal of the capacitor C and one terminal of a load R.

Another terminal of the capacitor C is grounded, and another terminal of the load R is grounded, too.

In FIG. 21 (A), a resistance (a resistance for measurement) rL to measure a reactor current (a current $i_L$ which flows through the reactor) is connected to the reactor L in series.

The control device 92 comprises a control circuit 921 and a driver 922.

The control circuit 921 inputs an input voltage (an input voltage E) of the DC/DC converter 91 and an output voltage $e_o$ and a reactor current $i_L$, and a control in the current critical mode can be performed.

In the current critical mode, the reactor current $i_L$ changes in a form of a saw wave pattern (or a shape that was similar in a shape of a saw wave pattern). In the current critical mode, a lowest current value of the reactor current $i_L$ is zero (or a value which is almost zero).

The control device 92 measures a voltage (a reactor voltage $v_L$) between two terminals of the reactor L.

And the control device 92 calculates the time when $i_L$ changes to zero based on $v_L/L$ (=$m_1$) and $(e_o-v_L)/L$ (=$m_2$); wherein "$v_L/L$" is a slant of the reactor current $i_L$ in an ON period $(t_1-t_2)$, "$(e_o-v_L)/L$" is a slant of the reactor current $i_L$ in an OFF period, and the time when $i_L$ changes to zero means a timing for turn-on.

As above, a control by the current critical mode is performed.

FIG. 22 (A) shows another DC/DC converter 93 of step-up and -down type and another control device 94.

In FIG. 22 (A), the reactor L is provided with a secondary winding $T_L$ for a measurement.

The control device 94 comprises a control circuit 941 and a driver 942.

The control circuit 941 inputs an input voltage (input voltage E) of the DC/DC converter 93, an output voltage eo of that and a reactor voltage $v_L$ of that.

The DC/DC converter 93 can perform a control with the current critical mode in this way.

As shown in FIG. 22 (A), a reactor voltage $v_L$ is measured as a measurement voltage $v_L'$.

The control circuit 941 calculates a time when the reactor current $i_L$ becomes zero, based on formula "Ldi=$-v_L$dt".

FIG. 23 shows an AC/DC converter (a switching power supply) 95 and a control device 96.

A technology to detect the reactor current $i_L$ is used in the system in FIG. 23.

In FIG. 23, a rectifier circuit RCD which inputs AC power to the input side of an AC/DC converter 95 is comprised.

The control device 96 comprises a control circuit 961 and a driver 962.

The control circuit 961 includes a third control part (a power factor improvement part) 9611.

By a control quantity which the third control part 9611 generates the AC/DC converter 95 runs with a current critical mode.

A power factor of the AC/DC converter 95 is improved in this way.

PRIOR ART DOCUMENTS

Non-Patent Document

[Non-Patent Document 1]
Chia-An Yeh et al Proc. IEEEECCE, pp. 1226-1231 (2010).

DISCLOSURE OF THE INVENTION

Problem to be Solved by the Invention

However, the DC/DC converter 91 of FIG. 21 (A) must include a resistance $r_L$ to measure a reactor current $i_L$, because the DC/DC converter 91 runs with the current critical mode.

Thus, there is a problem that an electric power loss by resistance $r_L$ increases.

Also, the DC/DC converter 93 of FIG. 22 (A) includes a secondary winding $T_L$ to measure the reactor current $i_L$, because the DC/DC converter 93 runs with a current critical mode.

Thus, constitutions of the system of FIG. 22 (A) become complicated.

Naturally, the same problems occur with the AC/DC converter 95 of FIG. 23 too.

In addition, with the control circuit 921 of FIG. 21 (A), the control circuit 941 of FIG. 22 (A), the control circuit 961 of FIG. 23, errors occur frequently, because a slant of reactor current $i_L$ is constant.

An object of the current invention is to provide a control device which calculates a peak value of a reactor current based on an output voltage and an input voltage of the DC/DC converter circuit and controls the DC/DC converter circuit with a predetermined current mode.

Another object of the current invention is to provide a control device which controls an AC/DC converter circuit with a predetermined current mode and improves a power factor of the AC/DC converter.

Means to Solve the Problem

The present invention assumes the following subject matter.

(1)

A control device of a power converter circuit having a DC/DC converter comprising a first control part, a second control part and a switch drive signal generation part:

wherein the first control part inputs a detected value of at least an output voltage, calculates a turn-off timing predicted value of a switch of the DC/DC converter based on the detected values, and sends a result of the calculation to a switch drive signal generation part;

the second control part inputs the output voltage and a detected value of an input voltage at least, and receives a turn-off timing predicted value from the first control part, calculates a peak value of a reactor current of the DC/DC converter based on the detected values and the turn-off timing predicted value, calculates a time when the reactor current decreases to a predetermined preset value (the time when addition time was added: a turn-on timing predicted value) as the initial value, sends a result of the calculation to the switch drive signal generation part;

the switch drive signal generation part receives the turn-off timing predicted value from the first control part and turns off the switch when the time reached the turn-off timing predicted value, and the switch drive signal generation part receives the turn-on timing predicted value from the second control part and turns on the switch when the time reached the turn-on timing predicted value.

In invention of (1), the first control part can input an output voltage and one or more other electric quantities.

These input electric quantities can be used for generating a control quantity.

The electric quantities are an input voltage, an output current, an output power, an input current, a switch current (a current which flows through a switch), a voltage between both terminals of a switch, a reactor current (a current which flows through the reactor), a reactor voltage (a voltage between both terminals of the reactor) or a value of a load.

The second control part can input an input voltage, an output voltage and one or more other electric quantities.

These input electric quantities can be used for generating a control quantity.

The electric quantities are an output current, an output power, an input current, a switch current (a current which flows through a switch), a voltage between both terminals of a switch, a reactor current (a current which flows through the reactor), a reactor voltage (a voltage between both terminals of the reactor) or a value of a load.

(2)

The control device of a power converter circuit according to (1):

wherein the second control part calculates the peak value of the reactor current as an initial value with a bottom value of the reactor current just before that (for example, before one switching period).

(3)

The control device of a power converter circuit according to (1) or (2):

wherein the second control part calculates the turn-on timing predicted value as zero with a predetermined preset value of the reactor current.

(4)

The second control part makes a first differential equation demanding the peak value of the above reactor current based on an equivalent circuit according to operation statuses representing an on-status or an off-status of the switch and the diode, and detects the peak value (a turn-off timing in a current critical mode, that is an on-time) of the reactor current by solving the first differential equation, the second control part makes a second differential equation to demand the time when the reactor current reaches the preset value, and detects the time when the reactor current reaches a predetermined preset value (a turn-off timing in a current critical mode (a zero cross point), that is an off-time) by solving the second differential equation.

(5)

The control device of a power converter circuit according to (4):

wherein the first differential equation is made by an equivalent circuit which the operation status of the switch is "on-status" and the operation status of the diode is "off-status".

(6)

The control device of a power converter circuit according to (1), (2), (3), or (4):

wherein, when the power converter circuit is a step-up and -down type, the first differential equation is made based on follow equations, $T_{on}=t_2-t_1$, $E_i-v_{Tr}=L(di_L/dt)+r_L i_L$, $e_o=e_c \cdot R/(R+r_c)$, $e_c/(R+r_c)=-C \cdot (de_c/dt)$, $E_i^*=E_i-v_{Tr}$, the second differential equation is made based on follow equations, $T_{off}=t_3-t_2$, $-v_D=L(di_L/dt)+r_L i_L+e_o$, $i_{L1}=C \cdot (de_c/dt)$, $e_o=e_c+r_c i_{L1}$, $e_o=R i_{L2}$, $i_L=i_{L1}+i_{L2}$, $e_o=e_c \cdot R/(R+r_c)+i_L \cdot R \cdot r_c/(R+r_c)$, when the power converter circuit is a step-down type, the first differential equation is made based on follow equations, $T_{on}=t_2-t_1$, $E_i-v_{Tr}=L(di_L/dt)+r_L i_L+e_o$, $e_o=e_c \cdot R/(R+r_c)$, $e_c/(R+r_c)=-C \cdot (de_c/dt)$, $E_i^*=E_i-v_{Tr}$, the second differential equation is made based on follow equations, $T_{off}=t_3-t_2$, $-v_D=L(di_L/dt)+r_L i_L+e_o$, $i_{L1}=C \cdot (de_c/dt)$, $e_o = e_c + r_c i_{L1}$, $e_o = R i_{L2}$, $i_L = i_{L1} + i_{L2}$, $e_o = e_c \cdot R/(R+r_c) + i_L \cdot R \cdot r_c/(R+r_c)$, when the power converter circuit is a step-up type,
the first differential equation is made based on follow equations, $T_{on} = t_2 - t_1$, $E_i - v_{Tr} = L(di_L/dt) + r_L i_L$, $e_o = e_c \cdot R/(R+r_c)$, $e_c/(R+r_c) = -C \cdot (de_c/dt)$, $E_i^* = E_i - v_{Tr}$, the second differential equation is made based on follow equations, $T_{off} = t_3 - t_2$, $E_i - v_D = L(di_L/dt) + r_L i_L + e_o$, $i_{L1} = C \cdot (de_c/dt)$, $e_o = e_c + r_c i_{L1}$, $e_o = R i_{L2}$, $i_L = i_{L1} + i_{L2}$;

wherein,
$T_{on}(=t_2-t_1)$ ... on-time of the switch
$T_{off}(=t_3-t_2)$ ... off-time of the switch
$E_i$ ... an input voltage
$E_i^*$ ... a mean value of the input voltage
$v_{Tr}$ ... a voltage descent under "on-status" of the transistor
$v_D$ ... a voltage descent of a diode
$i_L$ ... a reactor current
$i_{L1}$ ... a current flowing for a reactor from a capacitor:
$i_{L2}$ ... a current flowing for a reactor from a load
$e_o$ ... a output voltage
$e_c$ ... a capacitor voltage
R ... a load resistor
$r_L$ ... a reactor resistance
$r_c$ ... a capacitor resistance
C ... a capacitor
(7)
A control device for a power converter circuit consists of a rectifying circuit which rectifies AC power and a switching power supply which converts the rectified voltage to into a DC voltage, wherein the control device comprises a first control part and a second control part:

wherein, the first control part inputs a detected value of at least an output voltage of the switching power supply, calculates a turn-off timing predicted value of a switch of the switching power supply based on the detected values to improve a power factor of the switching power supply;

the second control part receives a input voltage and a turn-off timing predicted value at least, the second control part calculates a peak value of a reactor current of the power converter circuit, and calculates a turn-on timing predictive value (wherein a turn-on timing predictive value is a time or a time that an additional time is added when a reactor current decreases to a predetermined preset value from a peak value defined as an initial value).

In invention of (7), the first control part can input an output voltage and one or more other electric quantities.

These input electric quantities can be used for generating a control quantity.

The electric quantities are an input voltage, an output current, an output power, an input current, a switch current (a current which flows through a switch), a voltage between both terminals of a switch, a reactor current (a current which flows through the reactor), a reactor voltage (a voltage between both terminals of the reactor) or a value of a load.

The second control part can input an input voltage, a turn-off timing predicted value and one or more other electric quantities.

These input electric quantities can be used for generating a control quantity.

The electric quantities are an output voltage, an output current, an output power, an input current, a switch current (a current which flows through a switch), a voltage between both terminals of a switch, a reactor current (a current which flows through the reactor), a reactor voltage (a voltage between both terminals of the reactor) or a value of a load.

(8)
A control device for a power converter circuit consists of a rectifying circuit which rectifies AC power and a switching power supply which converts the rectified voltage to into a DC voltage, wherein the control device comprises a first control part and a second control part:

wherein, the first control part inputs a detected value of at least an output voltage of the power converter circuit, and calculates a turn-off timing basic value of the switch of the switching power supply;

the second control part inputs at least an input voltage of the power converter circuit and receives a turn-off timing predicted value, calculates a peak value of a reactor current of the power converter circuit, calculates a turn-on timing predictive value (wherein a turn-on timing predictive value is a time or a time that an additional time is added when a reactor current decreases to a predetermined preset value from a peak value defined as an initial value);

the third control part inputs at least the turn-off timing basic value, calculates the turn-off timing predicted value that the correction quantity for power factor improvement is added to the turn-off timing basic value; and the switch drive signal generation part receives the turn-off timing predicted value from the first control part, turns off the switch when a counted time reached the turn-off timing predicted value, receives the turn-on timing predicted value from the second control part, turns on the switch when a counted time reached the turn-on timing predicted value.

In invention of (8), the first control part can input an output voltage and one or more other electric quantities.

These input electric quantities can be used for generating a control quantity.

The electric quantities are an input voltage, an output current, an output power, an input current, a switch current (a current which flows through a switch), a voltage between both terminals of a switch, a reactor current (a current which flows through the reactor), a reactor voltage (a voltage between both terminals of the reactor) or a value of a load.

The second control part can input an input voltage, an output voltage and one or more other electric quantities.

These input electric quantities can be used for generating a control quantity.

The electric quantities are an output current, an output power, an input current, a switch current (a current which flows through a switch), a voltage between both terminals of a switch, a reactor current (a current which flows through the reactor), a reactor voltage (a voltage between both terminals of the reactor) or a value of a load.

Note that the third control part inputs turn-off timing basic value.

Even more particularly, the third control part can input a detected value of an input voltage and inputs a reactor current peak value from the second control part.

The turn-off timing predicted value that power factor improvement correction quantity was added to can be generated based on these electric quantities.

The second control part can input the detected value of the input voltage, the turn-off timing predicted value and output voltage.

The peak value of the reactor current of the power converter circuit can be generated based on these electric quantities.

In addition, the second control part can input the detected value of the input voltage, a turn-off timing predicted value and a detected value of the output voltage.

The peak value of the reactor current of the power converter circuit can be generated based on these electric quantities.

(9)

The control device of a power converter circuit according to (8):

wherein the turn-off timing basic value is a proportion control quantity, a differential control quantity, an integral control quantity or a control quantity which at least two were put together thereof.

(10)

The control device of a power converter circuit according to (8) or (9):

wherein the second control part calculates the peak value of the reactor current as an initial value with a bottom value of the reactor current just before that (for example, before one switching period).

(11)

The control device of a power converter circuit according to (8), (9) or (10):

wherein the second control part calculates the turn-on timing predicted value as zero with a predetermined preset value of the reactor current.

(12)

The second control part makes a first differential equation demanding the peak value of the above reactor current based on an equivalent circuit according to operation statuses representing an on-status or an off-status of the switch and the diode, and detects the peak value of the reactor current by solving the first differential equation, the second control part makes a second differential equation to demand the time when the reactor current reaches the preset value, and detects the time when the reactor current reaches a predetermined preset value (a turn-off timing in a current critical mode by solving the second differential equation).

Effect of the Invention

In the control device of the DC/DC converter of the present invention, the peak value of the reactor current is detected based on the output voltage and the input voltage.

The time when a reactor current decreases to a predetermined value is predicted by a calculation these electric quantities, and the DC/DC converter is controlled.

In a converter the present invention, any resistance or secondary winding to measure the reactor current is not used for the DC/DC converter.

Thus, useless electric power is not used. In addition, the simplification of the circuit is planned.

In the prior art, an incline of the reactor current is detected to find the peak value of the reactor current, and a straight line is similar at the incline.

According to the present invention, this conventional technique is not adopted.

According to the present invention, the control device demands the peak value of the reactor current by solving simple differential equation (the first differential equation in the present invention).

The time when the reactor current reaches a predetermined value from this peak value is predicted by a calculation, and the control device controls the power converter circuit.

In the control device of the present invention, the peak value of the reactor current is detected based on an output voltage and an input voltage.

In addition, for example, the means of the reactor current are detected based on the peak value of the reactor current.

That is in the control device of the present invention, the reactor current control is performed substantially.

Thus, the power factor can be improved without detecting directly the reactor current.

BRIEF DESCRIPTION OF DRAWINGS

FIG. 1 (B) is flow chart showing an operation of the control device.

FIG. 5 (A) is a wave form diagram when the DC/DC converter of FIG. 1 runs with a current continuous mode.

FIG. 5 (B) is a wave form diagram when the DC/DC converter of FIG. 1 runs with a current discontinuous mode.

FIG. 6 shows a transition of an ON/OFF status of a transistor switch Tr and a change of a reactor current.

FIG. 7 (A) is a diagram showing an operation status of a DC/DC converter.

FIG. 7 (B) is an explanatory diagram of an operation mode.

FIG. 8 (A) is a diagram showing an equivalent circuit of a DC/DC converter.

FIG. 8 (B) is a wave form diagram showing a transition of an ON/OFF status of a transistor switch and a change of a reactor current.

FIG. 9 (A) is a diagram showing an equivalent circuit of a DC/DC converter.

FIG. 9 (B) is a wave form diagram showing a transition of ON/OFF status of a transistor switch and a change of a reactor current.

FIG. 10 (A) is a diagram showing an equivalent circuit of a DC/DC converter.

FIG. 10 (B) is a wave form diagram showing a transition of an ON/OFF status of a transistor switch and a change of a reactor current.

FIG. 11 (A) is a diagram showing an equivalent circuit of a DC/DC converter.

FIG. 11 (B) is a wave form diagram showing a transition of an ON/OFF status of a transistor switch and a change of a reactor current.

FIG. 12 (A) is a diagram showing an equivalent circuit of a DC/DC converter.

FIG. 12 (B) is a wave form diagram showing a transition of an ON/OFF status of a transistor switch and a change of a reactor current.

FIG. 13 (A) is a diagram showing an equivalent circuit of a DC/DC converter.

FIG. 13 (B) is a wave form diagram showing a transition of an ON/OFF status of a transistor switch and a change of a reactor current.

FIG. 21 (A) is a diagram showing a DC/DC converter of the step-up and -down type and a control device performing zero point control by detecting a reactor current.

FIG. 21 (B) is a wave form diagram showing a transition of an ON/OFF status of a transistor switch and a change of a reactor current.

FIG. 22 (A) is a diagram showing a DC/DC converter of the step-up and -down type and a control device performing zero point control by detecting a reactor voltage.

FIG. 22 (B) is a wave form diagram showing a transition of an ON/OFF status of a transistor switch and a change of a reactor current.

DESCRIPTION OF PREFERRED EMBODIMENTS

Figure 1:
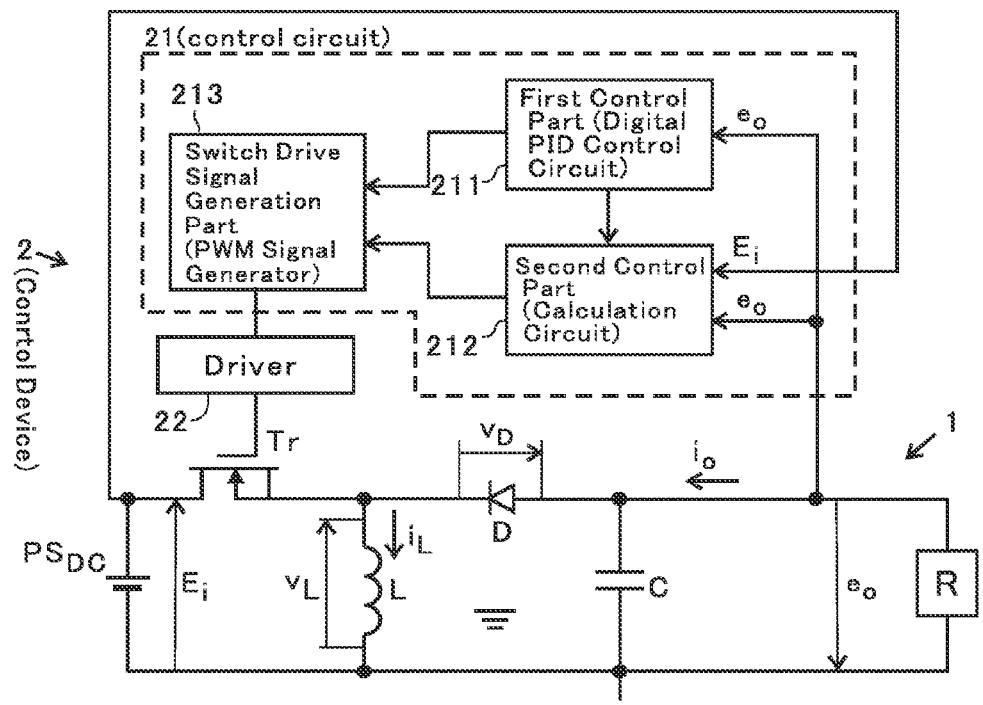
FIG. 1 (A) is a diagram showing an embodiment that applied a control device of the present invention to a DC/DC converter of a step-up and -down type.
Figure 1:
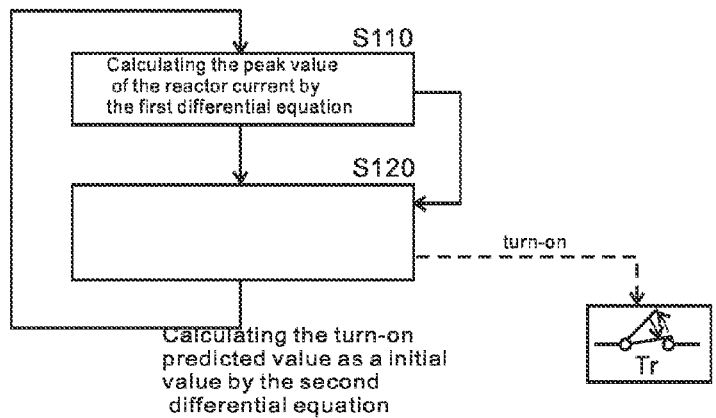

FIG. 1 (A) shows one embodiment of a control device of the present invention, and a DC/DC converter 1 is controlled by a control device 2.

The DC/DC converter 1 of FIG. 1 (A) is step-up and -down type, and the DC/DC converter 1 is composed of a power supply PSDC (an input voltage Ei of DC), a transistor switch Tr, a reactor L, a diode D and a capacitor C.

A power supply PSDC is connected to one side terminal of the transistor switch Tr, and another terminal of the transistor switch Tr is connected to one terminal of reactor L and a cathode of diode D.

Another terminal of the reactor L is grounded.

An anode of the diode D is connected to one terminal of a capacitor C and one terminal of a load R. Another terminal of capacitor C is grounded. Another terminal of load R is grounded, too.

In FIG. 1 (A), a control device 2 consists of a control circuit 21 and a driver 22.

A control circuit 21 consists of a first control part (a digital PID controller) 211, a second control part (an operation circuit) 212 and a switch drive signal generation part (a PWM signal generator) 213.

Figure 4:
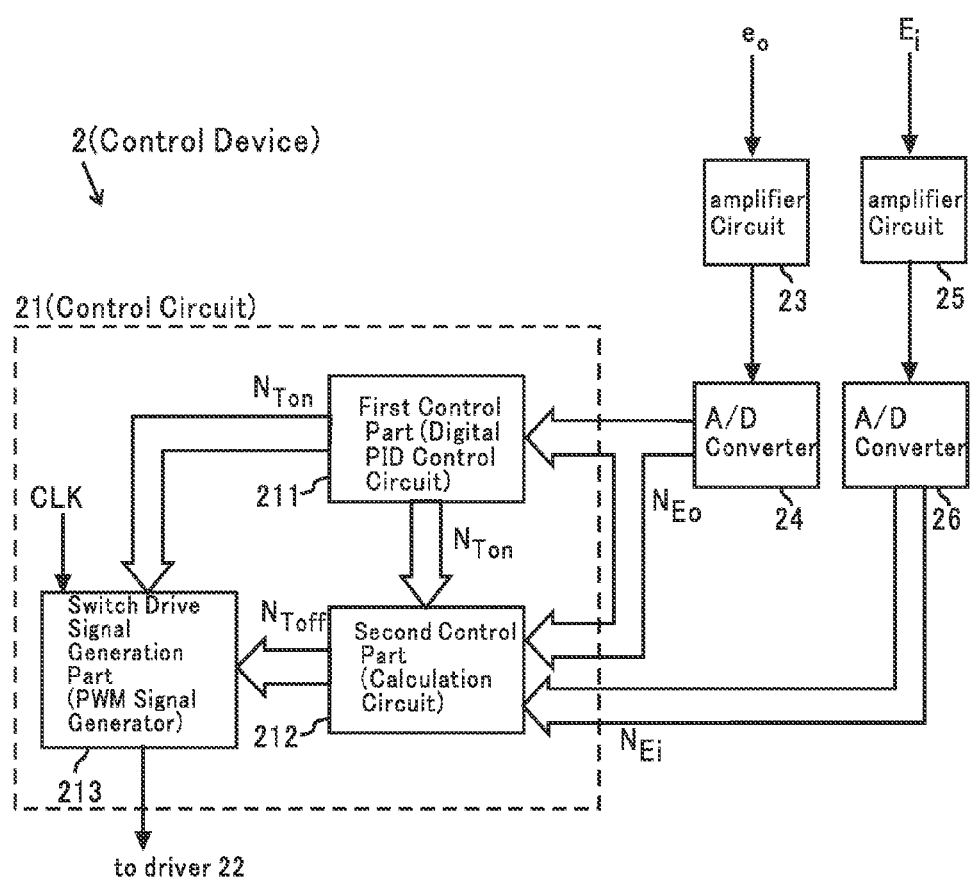
FIG. 4 is a detailed diagram of the control device for a DC/DC converter shown in FIG. 1.

FIG. 4 is an explanatory diagram of the control device 2 shown in FIG. 1.

Figure 5:
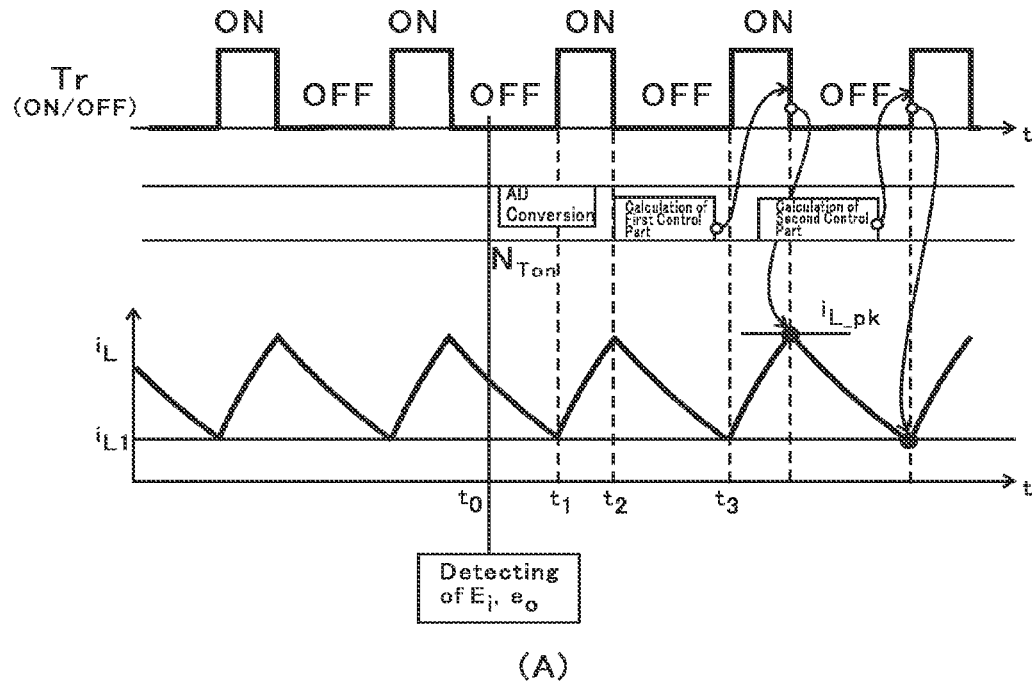
FIG. 5 is a diagram which shows a transition of an ON/OFF status of a transistor switch Tr and a change of a reactor current.
Figure 5:
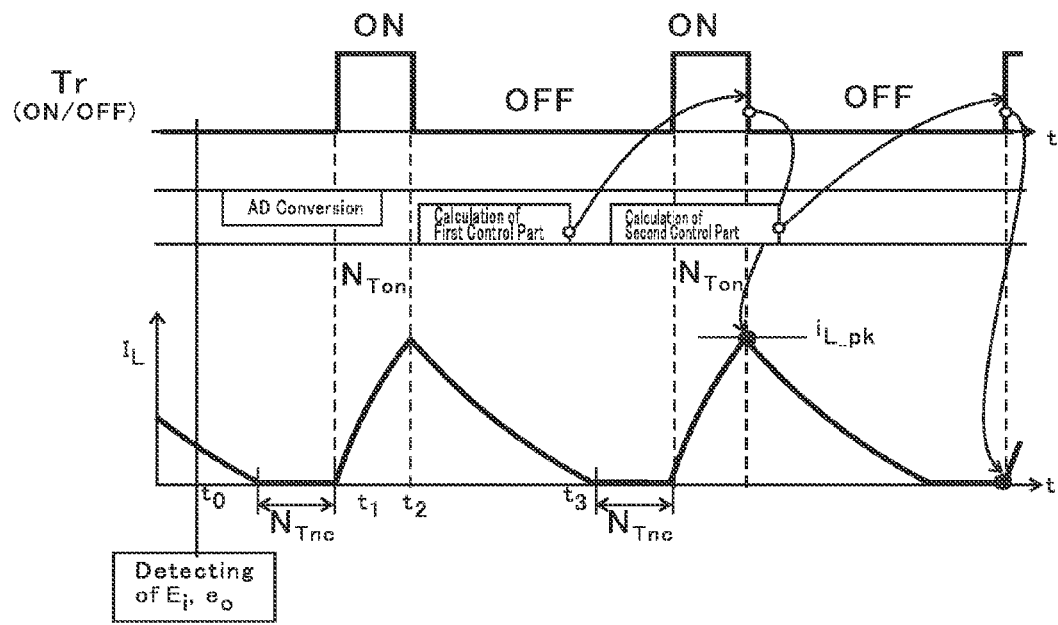
Figure 6:
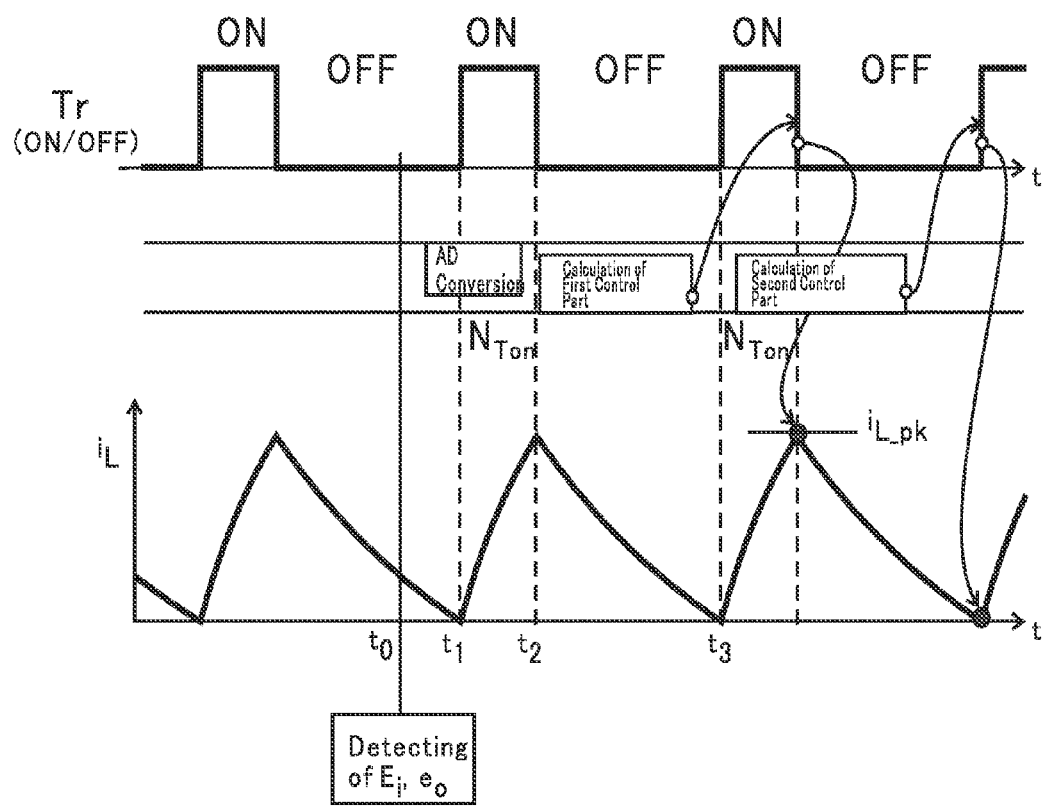
FIG. 6 is a wave form diagram when the DC/DC converter of FIG. 1 runs with a current critical mode.

FIGS. 5 (A), (B) and FIG. 6 are diagrams which show transitions of an ON/OFF status of a transistor switch Tr and a change of a current which flows through reactor L (a change of a reactor current).

The DC/DC converter 1 of FIG. 1 can runs with three operation modes I, II and III.

The operation mode I shown in FIG. 5 (A) is "a continuous mode".

In this mode, the reactor current $i_L$ does not become to zero.

With this operation mode I, a reactor current $i_L$ is controlled so that a bottom value is kept positive.

The operation mode II shown in FIG. 5 (B) is "a discontinuous mode".

With this mode, the reactor current $i_L$ continues zero, during one time length in one switching period.

A technique to control the time when reactor current $i_L$ continues zero is well-known.

With the current discontinuous mode II, the switching period is constant.

The operation mode III shown in FIG. 6 is "current critical mode".

The reactor current $i_L$ becomes zero with this mode.

However, the reactor current $i_L$ does not continue zero.

As shown in FIG. 1 (B), the second control part 212 calculates the peak value (a turn-off timing) of the reactor current by a first differential equation (S 110).

About the first differential equation, it is described below.

Also, a second control part 212 calculates a zero point (a bottom value) of the reactor current by a second differential equation (S 120).

The transistor switch Tr is turned on based on this bottom value.

The operation of a DC/DC converter 1 of FIG. 1 is described as follows. In this explanation, FIG. 4, FIGS. 5 (A), (B) and FIG. 6 are referred to.

An output voltage $e_o$ of the DC/DC converter 1 is amplified by an amplification circuit 23.

An output voltage $e_o$ is converted into a digital signal ($N_{eo}$) by an A/D converter 24.

And the output voltage $e_o$ is input into a first control part 211 and a second control part 212.

Also, an input voltage Ei of the DC/DC converter 1 is amplified by the amplification circuit 25.

The input voltage $E_i$ is converted into a digital signal ($N_{Ei}$) by an A/D converter 26.

Then, the digital signal $N_{Ei}$ is input in second control part 212 (refer time t0 of FIG. 6).

The first control part 211 calculates an "on-status retention time" ("on-time signal $N_{Ton}$"=$t_2-t_1$) of a transistor switch Tr based on a detected value (digital signal $N_{eo}$) which is input.

This calculation result ("on-time signal" $N_{Ton}$) is sent to the switch drive signal generation part 213 and the second control part 212.

The second control part 212 calculates a peak value $i_{L\_pk}$ of a current flowing through the reactor L (a reactor current $i_L$) based on a detected value (a digital signal $N_{Ei}$) and an "on status retention time" ("on-time signal" $N_{Ton}$) which is input from the first control part 211.

The second control part 212 calculates the time (off time $N_{Toff}=t_3-t_2$) that a reactor current $i_L$ decreases to a predetermined value from a peak value $i_{L\_pk}$ defined as an initial value.

This calculation result is sent to the switch drive signal generation part 213.

The switch drive signal generation part 213 generates the PWM signal based on "on-time signal" $N_{Ton}$ received from the first control part 211.

This PWM signal is sent to driver 22.

The switch drive signal generation part 213 generates the PWM signal based on "off time" $N_{Toff}$ received from the first control part 212.

This PWM signal is sent to driver 22.

Then a processing to detect the peak value $i_{L\_pk}$ in the second control part 211 and a processing to detect the off-time $N_{Toff}$ in the second control part 211 are described.

FIG. 7 (A) is a diagram showing the operation status of the DC/DC converter 1.

In FIG. 7 (A), three operation statuses, OS_1, OS_2 and OS_3 of are defined.

These statuses depend on combinations of an ON/OFF of the transistor switch Tr and an ON/OFF of the diode D.

FIG. 7 (B) is a diagram showing relations of the operation modes and the operation statuses.

In the operation mode (a current continuous mode) I, the status is OS_1 or OS_2.

In these statuses the reactor current $i_L$ does not become to zero.

In the operation mode (a current discontinuous mode) II, the status is OS_1, OS_2 or OS_3.

In the statuses OS_1 or OS_2 the reactor current $i_L$ does not become to zero. However in the statuses OS_3 the reactor current $i_L$ becomes to zero.

In the operation mode (a current critical mode) III, the status is OS_1 or OS_2.

In the operation mode III, the reactor current $i_L$ becomes zero for an instant.

A condition of the operation mode III (the current critical mode) is described below.

Figure 8:
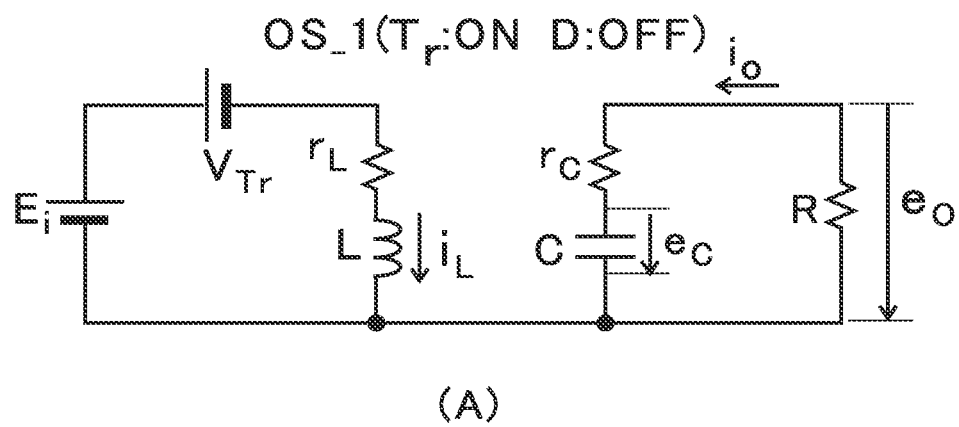
FIG. 8 is an operation explanatory diagram when an operation status of a DC/DC converter of a step-up and -down type is OS_1.
Figure 8:
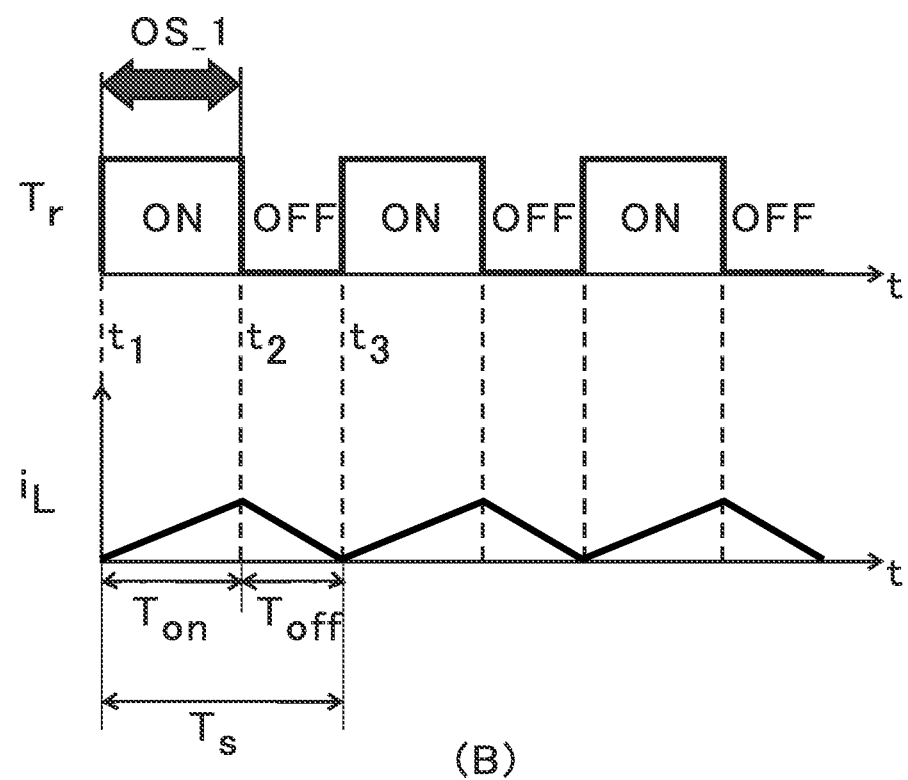

FIG. 8 (A) is an equivalent circuit of the DC/DC converter 1 when the operation status is OS_1.

FIG. 8 (B) is the wave form diagram showing the transition of an ON/OFF status of a transistor switch Tr and a change of the current which flows through the reactor L (the reactor current $i_L$) when the operation status is OS_1.

The following formulas are derived, based on an equivalent circuit of FIG. 8 (A).

$$T_{on}=t_2-t_1,$$

$$E_i-v_{Tr}=L(di_L/dt)+r_L i_L,$$

$$e_o=e_c\cdot R/(R+r_c),$$

$$e_c/(R+r_c)=-C\cdot(de_c/dt),$$

$$E_i^*=E_i-v_{Tr},$$

Herein, $T_{on}$ (=$t_2-t_1$) is the on-time for switch, $E_i$ is the input voltage, $E_i^*$ is a mean of the input voltage, $v_{Tr}$ is the voltage descend when the transistor $T_r$ turned on, $i_L$ is the reactor current, $e_o$ is the output voltage, $e_c$ is the capacitor voltage, R is a load resistance, $r_L$ is a reactor resistance and $r_c$ is capacitor resistance.

A formula (1) is derived based on these formulas.

A formula (1) is the first differential equation in the present invention.

$$i_L(t)=Z_1+Z_2(t_1)\exp\{-A1(t-t_1)\} \quad (1)$$

Here, $$Z_1=A_3/A_1, Z_2(t_1)=A_2(t_1)A_3/A_1$$

$$A_1=r_1/L, A_2(t_1)=i_L(t_1), A_3=E_1^*/L$$

A peak value $i_{L\_pk}$ of the reactor current iL is found based on a formula (1).

Figure 9:
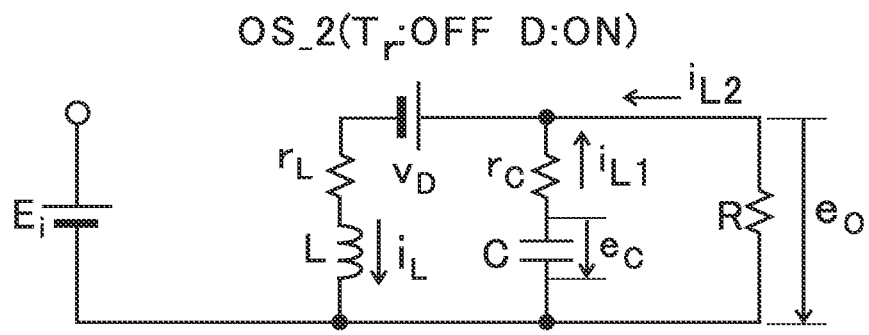
FIG. 9 is an operation explanatory diagram when an operation status of a DC/DC converter of a step-up and -down type is OS_2.
Figure 9:
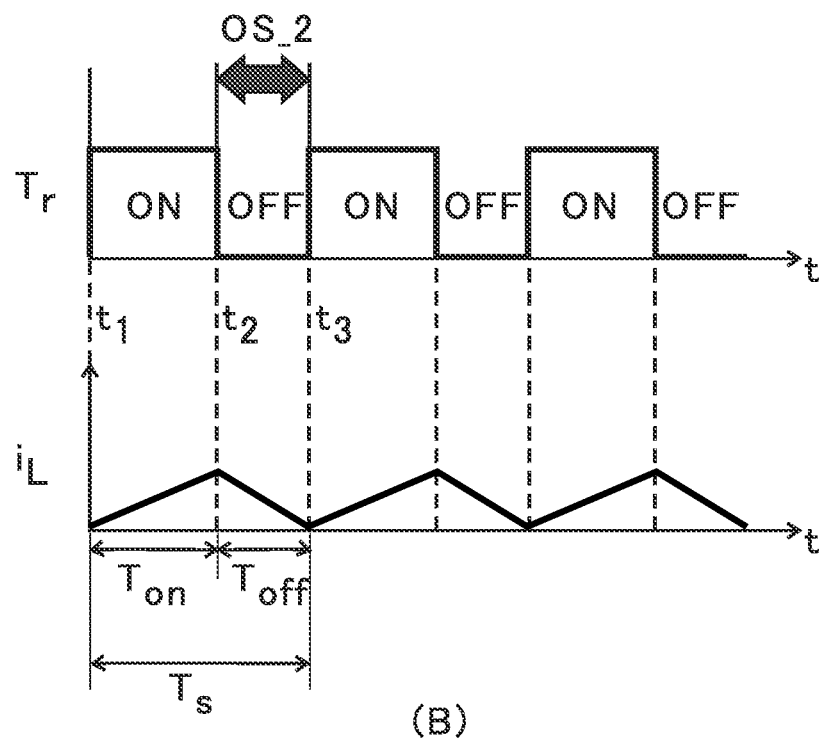

FIG. 9 (A) is a diagram showing an equivalent circuit of the DC/DC converter 1 when the operation status is OS_2.

FIG. 9 (B) is the wave form diagram showing the transition of an ON/OFF status of a transistor switch Tr and a change of the current which flows through the reactor L (the reactor current $i_L$) when the operation status is OS_2.

The formula (2) is derived based on an equivalent circuit of FIG. 9 (A).

$$T_{off}=t_3-t_2$$

$$-v_D=L(di_L/dt)+r_L i_L+e_o \quad (2)$$

. . . (2)

Here, $$i_{L1}=C\cdot(de_c/dt),$$

$$e_o=e_c+r_c i_{L1},$$

$$e_o = Ri_{L2},$$

$$i_L = i_{L1} + i_{L2},$$

$$e_o = e_c \cdot R/(R+r_c) + i_L \cdot R \cdot r_c/(R+r_c),$$

A formula (2) is derived based on these formulas.

A formula (2) is the second differential equation in the present invention.

$$i_L(t) = Q_1 + [Q_2(t)\cos\{B_4(t-t_2) + Q_3(t_2)\sin\{B_4(t-t_2)\}\}] \exp\{B_3(t-t_2)\} \qquad (3)$$

Here, $$B_3 = A_1/2$$

$$B_4 = D^{1/2}/2$$

$$D = A_1^2 - 4A_2$$

$$Q_1 = A_3/A_2, Q_2(t_2) = A_5(t_2)A_3/A_2,$$

$$Q_3(t_2) = A_4(t_2)/B_4 + \{B_3A_5(t_2)/B_4\} \times \{(A_1A_3 + A_3B_3)/A_2B_4\}$$

$$A_1 = 1/C(R+r_c) + r_2/L + Rr_c/L(R+r_c)$$

$$A_2 = 1/LC \times \{(R+r_2)/(R+r_c)\}$$

$$A_3 = E_D/\{LC \times (R+r_c)\}$$

$$A_4(t_2) = (1/L)\{E_D + e_o(t_2)\} + i_L(t_2)(L+r_cCR)/LC(R+r_c)$$

$$A_5(t_2) = i_L(t_2) = i_{L\_pk}$$

The time t when iL becomes zero is found based on the formula (3).

The time t is the -on timing (zero cross point) in the current critical mode III.

About a DC/DC converter 3 (a control device 4), the processing like the above is executed.

Thus, two differential equations are made from an equivalent circuit as described above.

These differential equations are the first differential equation and the second differential equation in the present invention.

The peak value and the zero cross point of the reactor current iL are found by solving these differential equations.

Figure 10:
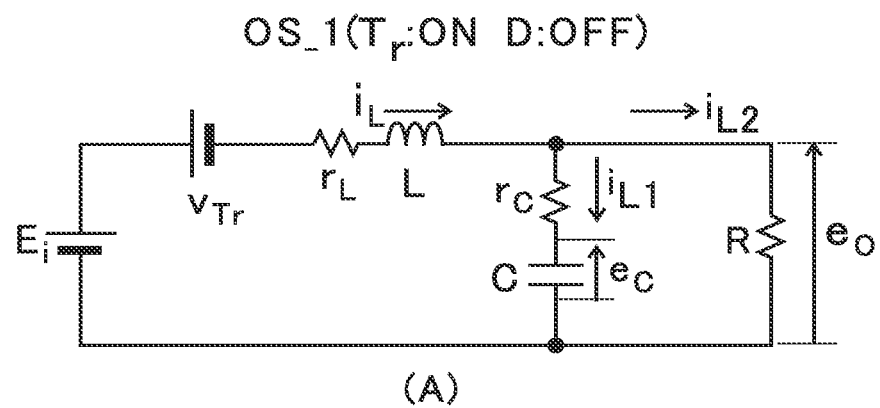
FIG. 10 is an operation explanatory diagram when an operation status of a DC/DC converter of a step-down type is OS_1.
Figure 10:
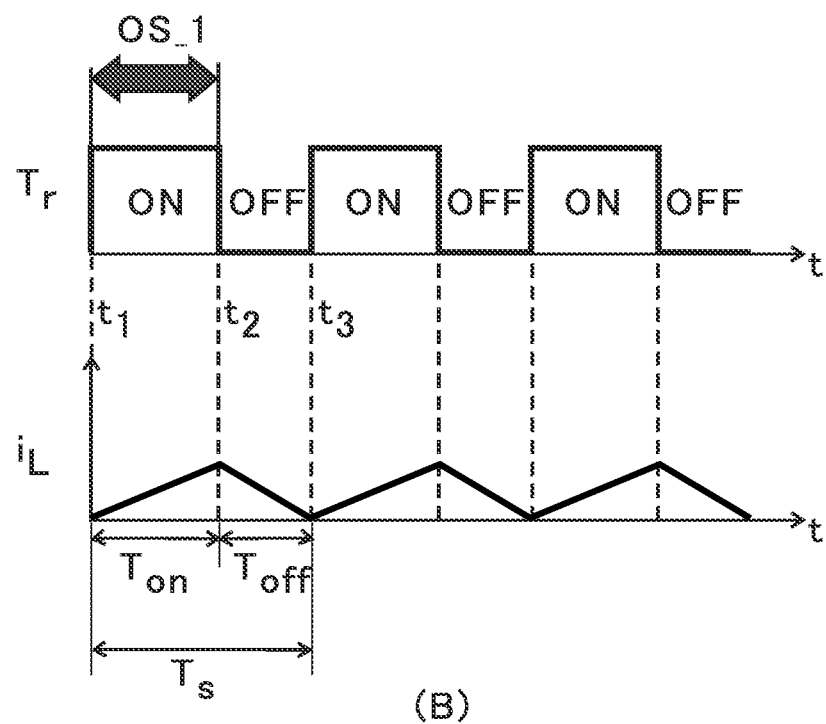

FIG. 10 is an operation explanatory diagram when the operation status of the DC/DC converter 3 of a step-down type is OS_1.

FIG. 10 (A) is a diagram showing an equivalent circuit of the DC/DC converter 3.

FIG. 10 (B) is a wave form diagram showing a transition of an ON/OFF status of the transistor switch Tr and a change of the reactor current $i_L$.

A condition of the operation mode III (the current critical mode) is described below.

Formulas which are described below are derived based on the equivalent circuit of FIG. 10 (A).

$$T_{on} = t_2 - t_1$$

$$E_i - v_{Tr} = L(di_L/dt) + r_L i_L + e_o$$

$$e_o = e_c \cdot R/(R+r_c)$$

$$e_c/(R+r_c) = -C \cdot (de_c/dt)$$

$$E_i^* = E_i - v_{Tr}$$

Here, $T_{on}$ ($= t_2 - t_1$) is the on-time for switch,
$E_i$ is the input voltage,
$E_i^*$ is a mean of the input voltage,
$v_{Tr}$ is the voltage descend when the transistor Tr turned on,
$i_L$ is the reactor current,
$e_o$ is the output voltage,
$e_c$ is the capacitor voltage,
R is a load resistance,
$r_L$ is a reactor resistance and
$r_c$ is capacitor resistance.

A formula (1) is derived based on these formulas.

A formula (1) is the first differential equation in the present invention.

A peak value of the reactor current $i_L$ is found by solving these differential equations.

A peak value of the reactor current $i_L$ means a turn-off timing in a current critical mode (thus "on-time").

Figure 11:
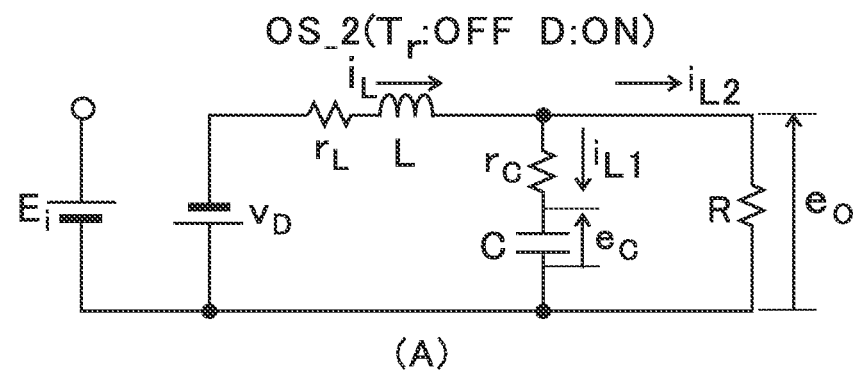
FIG. 11 is an operation explanatory diagram when an operation status of a DC/DC converter of a step-down type is OS_2.
Figure 11:
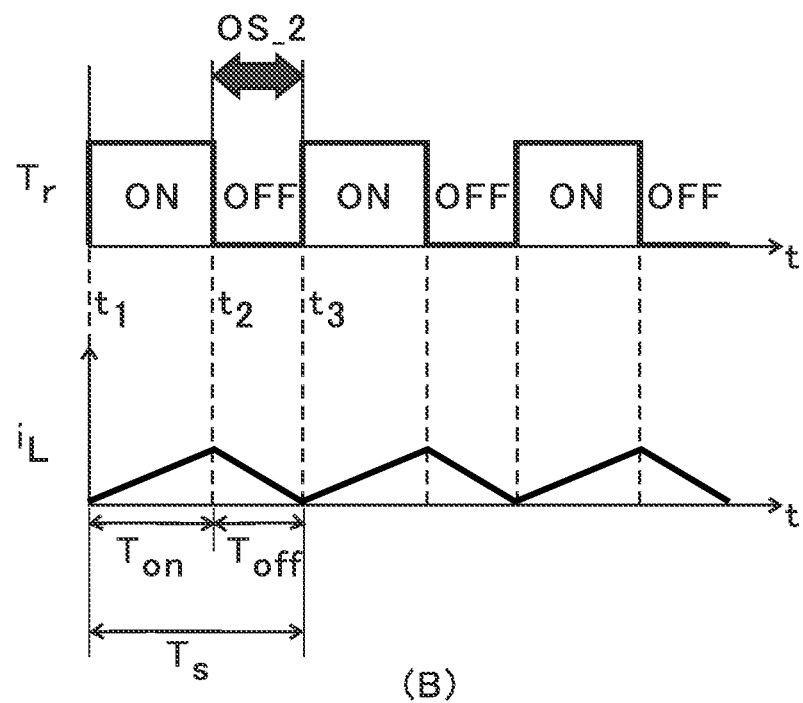

FIG. 11 is an operation explanatory diagram when an operation status of the DC/DC converter 3 of a step-down type is OS_2.

FIG. 11 (A) is a diagram showing an equivalent circuit of the DC/DC converter 3.

FIG. 11 (B) is a wave form diagram showing a transition of an ON/OFF status of the transistor switch Tr and a change of a reactor current $i_L$.

A condition of the operation mode III (the current critical mode) is described below.

Formulas which are described below are derived based on the equivalent circuit of FIG. 11 (A).

$$T_{off} = t_3 - t_2$$

$$v_D = L(di_L/dt) + r_L i_L + e_o$$

$$i_{L1} = C \cdot (de_c/dt)$$

$$e_o = e_c + r_c i_{L1}$$

$$e_o = Ri_{L2}$$

$$i_L = i_{L1} + i_{L2},$$

$$e_o = e_c \cdot R/(R+r_c) + i_L \cdot R \cdot r_c/(R+r_c)$$

A formula (2) is derived based on these formulas.

A formula (2) is the second differential equation in the present invention.

The time when the reactor current iL is a predetermined value is found by solving these differential equations.

The time means a turn-on timing in a current critical mode (thus "off-time").

About a DC/DC converter 5 (a control device 6), the processing like the above is executed.

That is, two differential equations are made from an equivalent circuit as described above.

These differential equations are the first differential equation and the second differential equation in the present invention.

The peak value and the zero cross point of the reactor current $i_L$ are found by solving these differential equations.

Figure 12:
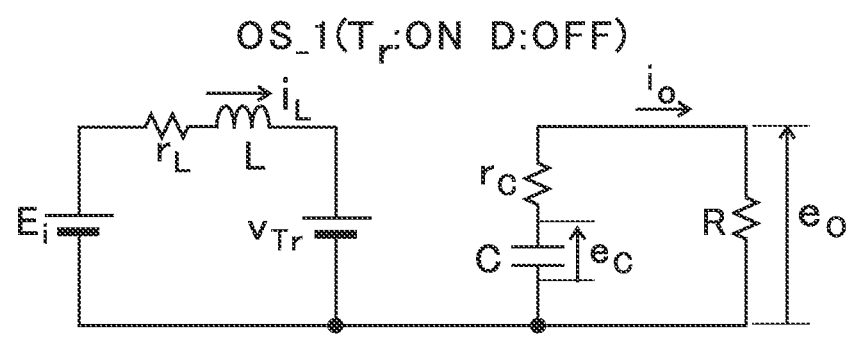
FIG. 12 is an operation explanatory diagram when an operation status of a DC/DC converter of a step-up type is OS_1.
Figure 12:
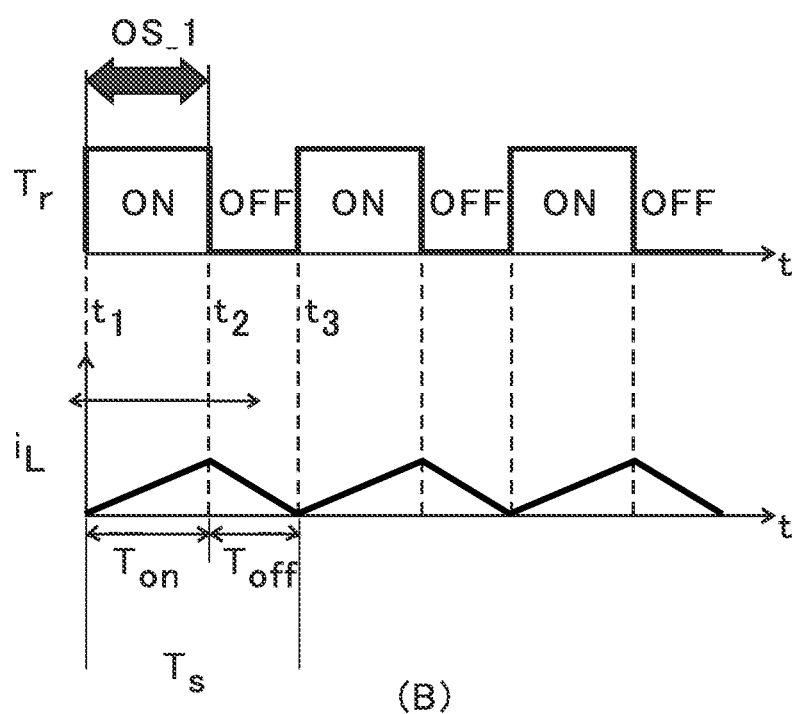

FIG. 12 is an operation explanatory diagram when the operation status of the DC/DC converter 3 of the step-up type is OS_1.

FIG. 12 (A) is a diagram showing an equivalent circuit of a DC/DC converter 3.

FIG. 12 (B) is a wave form diagram showing a transition of an ON/OFF status of the transistor switch Tr and a change of a reactor current $i_L$.

A condition of the operation mode III (the current critical mode) is described below.

Formulas which are described below are derived based on the equivalent circuit of FIG. 12 (A).

$$T_{on} = t_2 - t_1$$

$$E_i - v_{Tr} = L(di_L/dt) + r_L i_L$$

$$e_o = e_c \cdot R/(R+r_c)$$

$$e_c/(R+r_c) = -C \cdot (de_c/dt)$$

$$E_i^* = E_i - v_{Tr}$$

Here, $T_{on}(=t_2-t_1)$ is the on-time for switch,
$E_i$ is the input voltage,
$E_i^*$ is a mean of the input voltage,
$v_{Tr}$ is the voltage descend when the transistor Tr turned on,
$i_L$ is the reactor current,
$e_o$ is the output voltage,
$e_c$ is the capacitor voltage,
R is a load resistance,
$r_L$ is a reactor resistance and
rc is capacitor resistance.

A formula (1) is derived based on these formulas.

A formula (1) is the first differential equation in the present invention.

A peak value of the reactor current $i_L$ is found by solving these differential equations.

A peak value of the reactor current $i_L$ means a turn-off timing in a current critical mode (thus "on-time").

Figure 13:
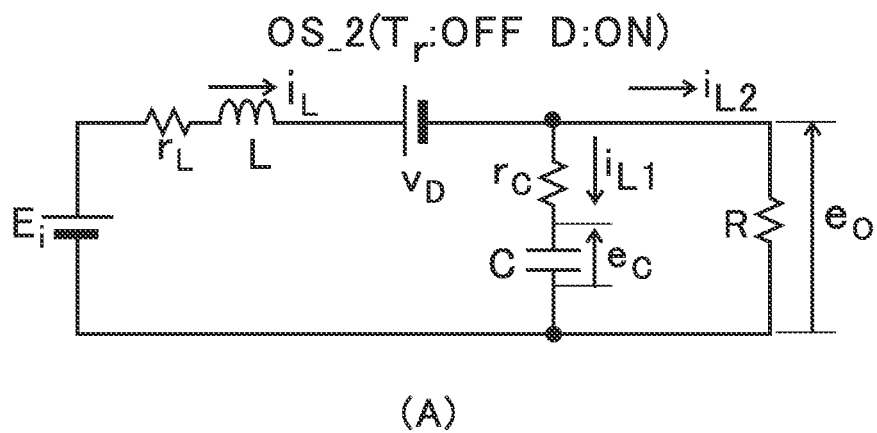
FIG. 13 is an operation explanatory diagram when an operation status of a DC/DC converter of a step-up type is OS_2.
Figure 13:
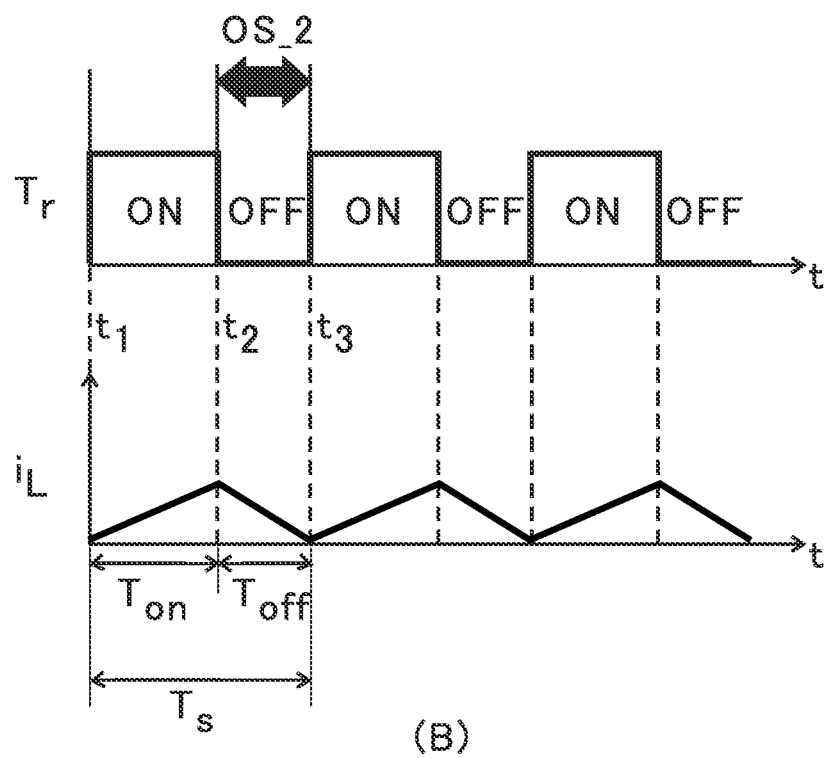

FIG. 13 is an operation explanatory diagram when an operation status of the DC/DC converter 3 of a step-up type is OS_2.

FIG. 13 (A) is a diagram showing an equivalent circuit of the DC/DC converter 3.

FIG. 13 (B) is a wave form diagram showing a transition of an ON/OFF status of the transistor switch Tr and a change of a reactor current.

A condition of the operation mode III (the current critical mode) is described below.

Formulas which are described below are derived based on the equivalent circuit of FIG. 13 (A).

$$T_{off} = t_3 - t_2$$

$$E_i - v_D = L(di_L/dt) + r_L i_L + e_o$$

$$i_{L1} = C \cdot (de_c/dt)$$

$$e_o = e_c + r_c i_{L1}$$

$$e_o = R i_{L2}$$

$$i_L = i_{L1} + i_{L2},$$

$$e_o = e_c \cdot R/(R+r_c) + i_L \cdot R \cdot r_c/(R+r_c)$$

A formula (2) is derived based on these formulas.

A formula (2) is the second differential equation in the present invention.

The time when the reactor current $i_L$ is a predetermined value is found by solving these differential equations.

The time means a turn-on timing in a current critical mode (thus "off-time").

Figure 14:
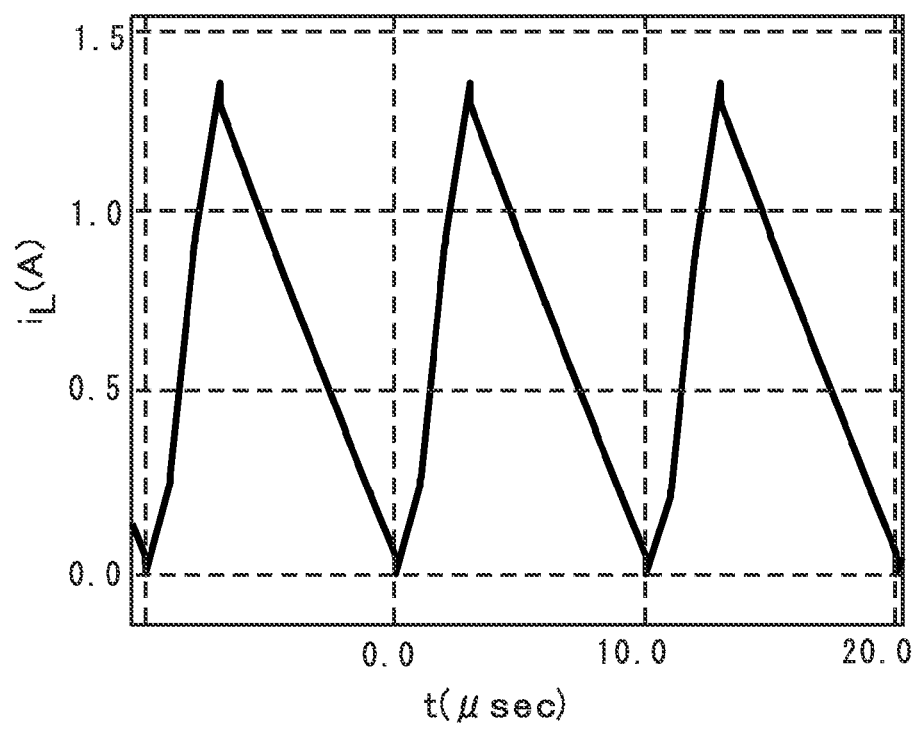
FIG. 14 is a graph which shows a simulation example when a DC/DC converter of a step-up and -down type was controlled with a current critical mode by a control device of the present invention.

FIG. 14 is a graph which shows a simulation example when the DC/DC converter 1 of a step-up and -down type was controlled with a current critical mode by the control device 2.

The DC/DC converter 1 and the control device 2 are shown in FIG. 1

The specific values of each element are as follows.
Ei=20[V],
eo=5 [V],
L=20[micro H],
C=270[micro F],
R=10 [ohm],
fs=100 [kHz].

The resolving power of the A/D converter is 10 bits.

As shown in FIG. 14, according to the control device of the present invention, good mode controls (a current critical mode control, etc.) are performed.

Figure 15:
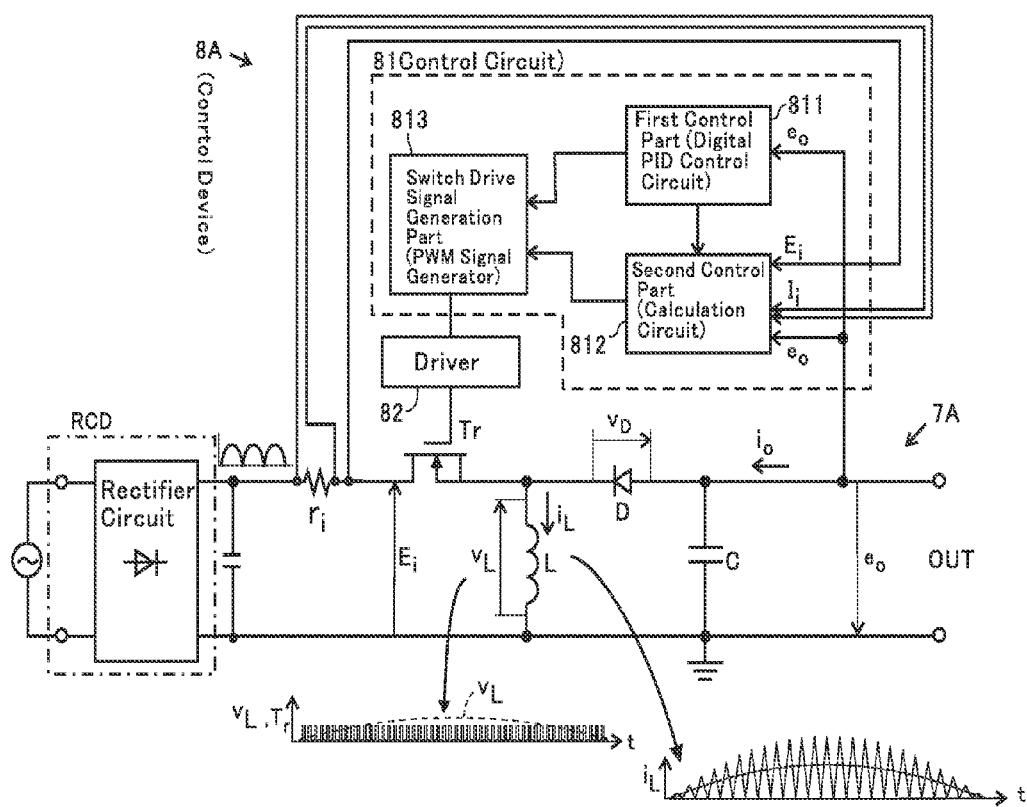
FIG. 15 is a diagram which shows one embodiment of a control device (a control device for an AC/DC converter) of the present invention.

FIG. 15 is a diagram which shows one embodiment of a control device (a control device for an AC/DC converter) of the present invention.

In FIG. 15, an AC/DC converter 7A is controlled by a control device 8A.

The AC/DC converter 7A of FIG. 15 is comprised of a rectifying circuit RCD inputting electric power and a converter inputting the rectification output of rectifying circuit RCD.

The converter consists of a transistor switch Tr, a reactor L, a diode D and a capacitor C.

The rectifying circuit RCD is connected to one side terminal of the transistor switch Tr.

The other terminal of the transistor switch Tr is connected to one side terminal of the reactor L and a cathode of the diode D.

Another terminal of the reactor L is grounded.

An anode of the diode D is connected to one side terminal of the capacitor C and the load R.

Another terminal of the capacitor C is grounded.

The output terminal (OUT) of the AC/DC converter 7 can be connected to an input terminal of the DC/DC converter 1 which illustrated by FIG. 1 (not shown).

Figure 2:
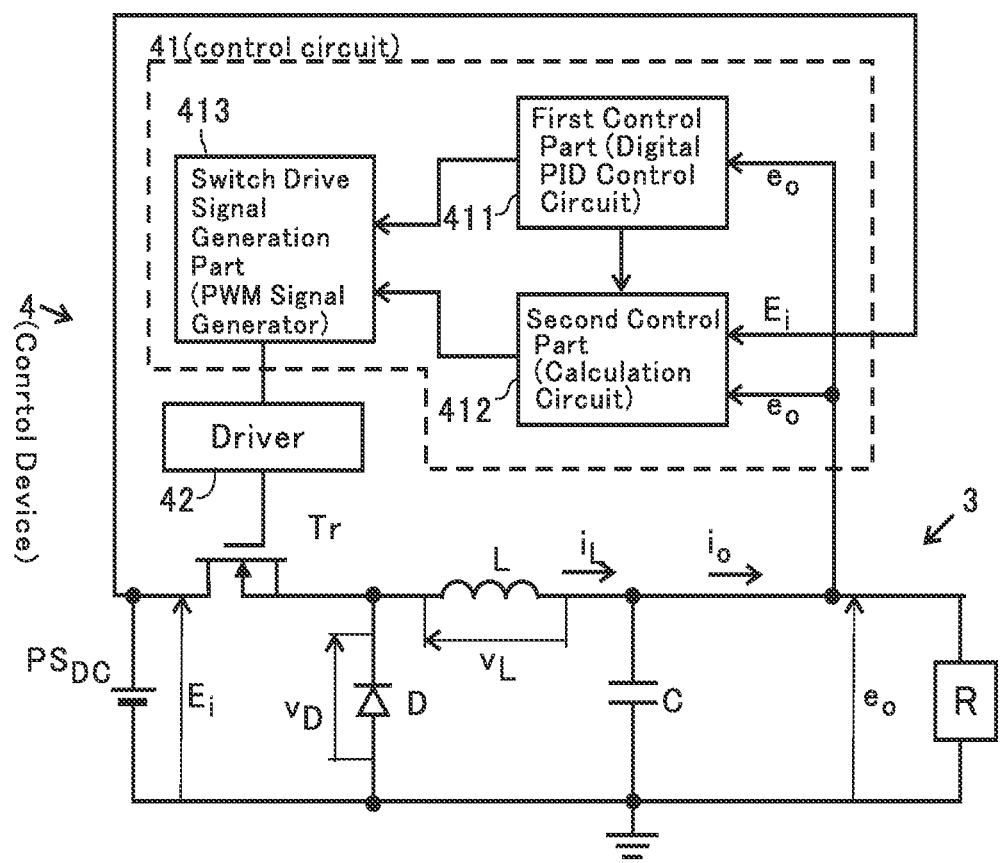
FIG. 2 is a diagram which shows an embodiment that applied a control device of the present invention to a DC/DC converter of a step-down type.

The output terminal (OUT) of the AC/DC converter 7 can be connected to an input terminal of the DC/DC converter 3 which illustrated by FIG. 2 (not shown).

Figure 3:
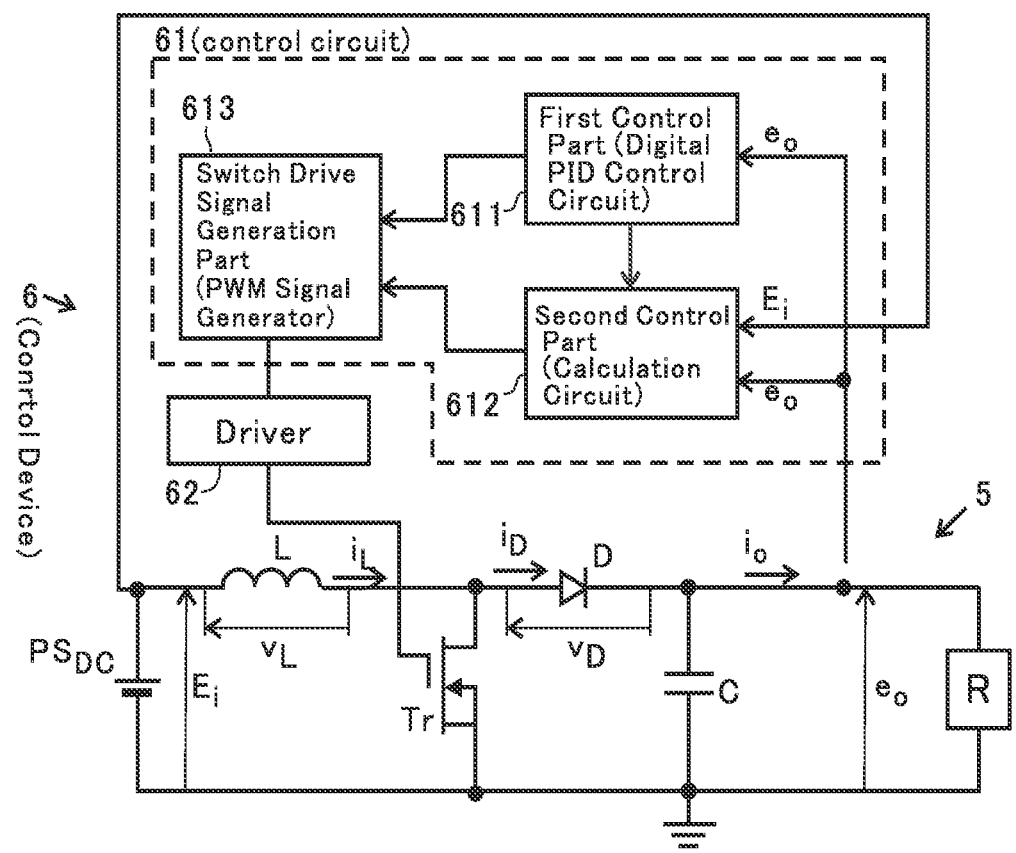
FIG. 3 is a diagram which shows an embodiment that applied a control device of the present invention to a DC/DC converter of a step-up type.

The output terminal (OUT) of the AC/DC converter 7 can be connected to an input terminal of the DC/DC converter 5 which illustrated by FIG. 3 (not shown).

Also, the output terminal of the AC/DC converter 7 can be connected to the load R (not shown).

The control device 8A consists of a control circuit 81 and a driver 82.

The control circuit 81 (a digital PID control circuit) is comprised of a first control part 811 (a digital PID control circuit), a second control part 812 and a switch drive signal generation part 813 (an operation circuit).

Figure 16:
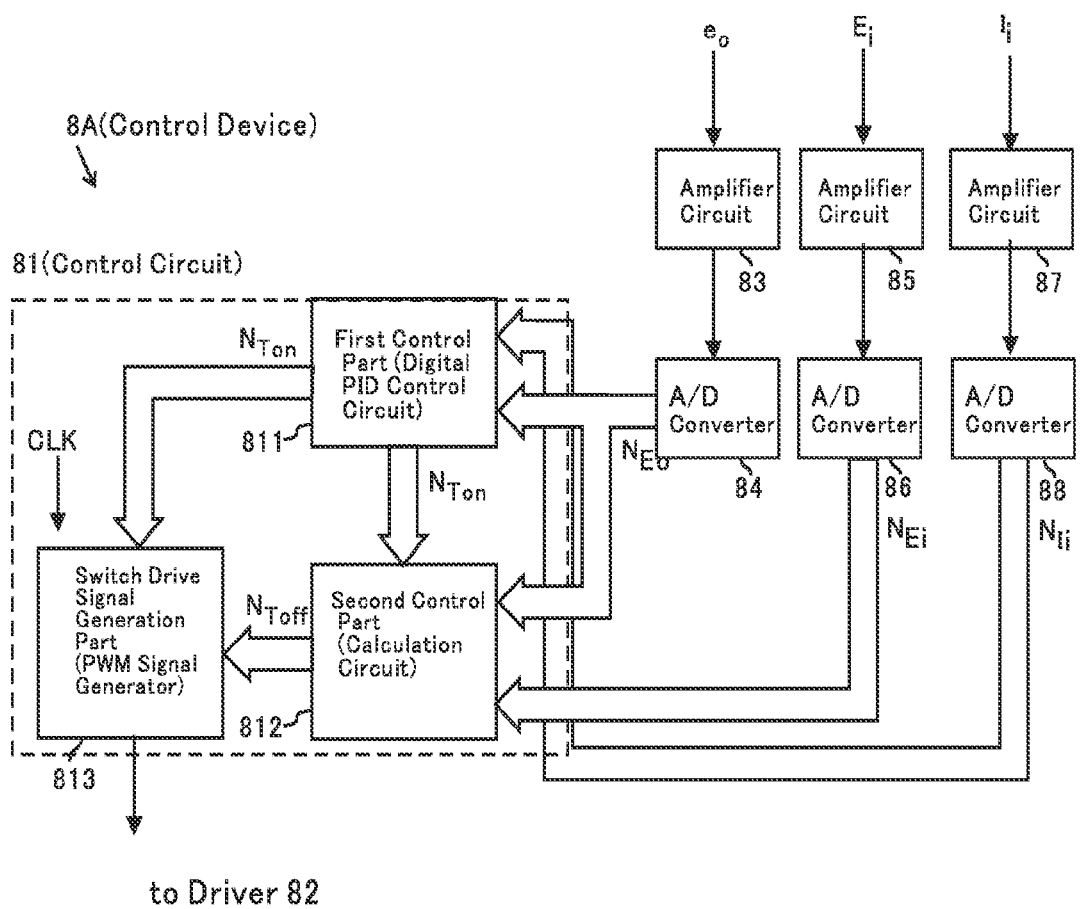
FIG. 16 is a detailed explanatory diagram of a control device of an AC/DC converter shown in FIG. 15.

FIG. 16 is a detailed explanatory diagram of a control device 8A of the AC/DC converter shown in FIG. 15.

The output voltage $e_o$ of the AC/DC converter 7A is amplified by an amplification circuit 83.

An output voltage $e_o$ is converted into a digital signal ($N_{eo}$) by an A/D converter 84.

The digital signal (Neo) is input into a first control part 811 and a second control part 812.

An output voltage (an input voltage $E_i$ of a switching power supply) of a rectifying circuit RCD is amplified by an amplification circuit 85.

The input voltage $E_i$ is converted into a digital signal ($N_{Ei}$) by an A/D converter 86.

The digital signal ($N_{Ei}$) is input into a second control part 812.

An output current (an input current Ii of the switching power supply) of the rectifying circuit RCD is amplified by an amplification circuit 87.

The input current Ii is converted into a digital signal ($N_{Ii}$) by an A/D converter 88.

The digital signal ($N_{Ei}$) is input into a second control part 812.

A first control part 811 calculates a PID control quantity that a power factor was improved based on an output voltage $E_o$ (digital signal Neo) and an input current $I_i$ (digital signal $N_{Ii}$) of the switching power supply.

The calculated values are sent to a switch drive signal generation part 813 as a turn-off timing predicted value ("on-status retention time" $N_{Ton}$).

The second control part 812 calculates a peak value $i_{L\_pk}$ (a digital signal $N_{Ei}$) of a reactor current $i_L$, based on a detected value of an input voltage $E_i$ and an "on-status retention time" ($N_{Ton}$) received from a first control part 811.

The second control part 812 calculates the time (off time $N_{Toff}$) that reactor current iL becomes to predetermined value from a peak value $i_{L\_pk}$ defined as an initial value.

This calculation result is sent to the switch drive signal generation part 813.

Figure 17:
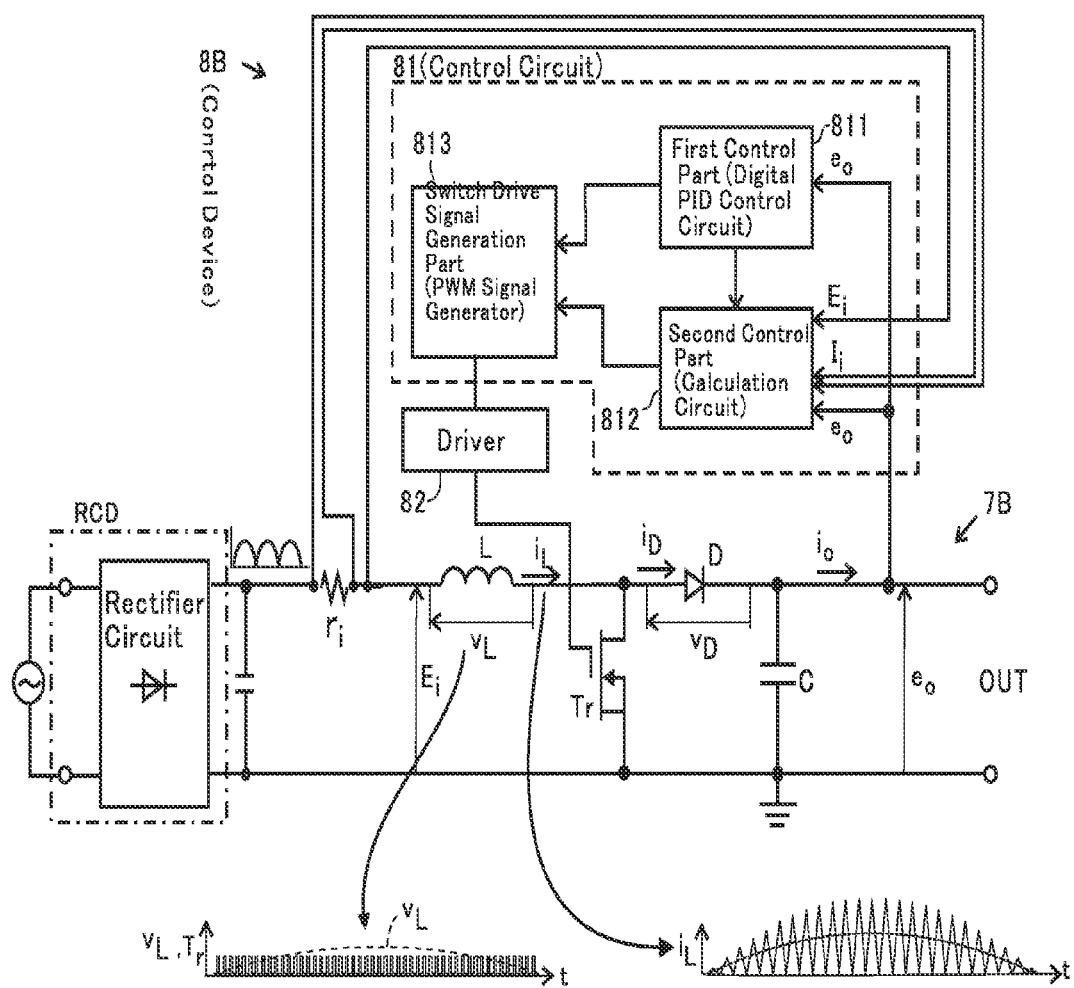
FIG. 17 is a diagram showing another embodiment of a control device (a control device for an AC/DC converter) of the present invention.

FIG. 17 is a diagram showing another embodiment of a control device (a control device for an AC/DC converter) of the present invention.

In FIG. 17, a switching power supply of an AC/DC converter 7B comprises a converter of a step-up type.

A constitution and the operation of the control device 8B are the same as the constitution and the operation of the control device 8A of FIGS. 15 and 16.

Figure 18:
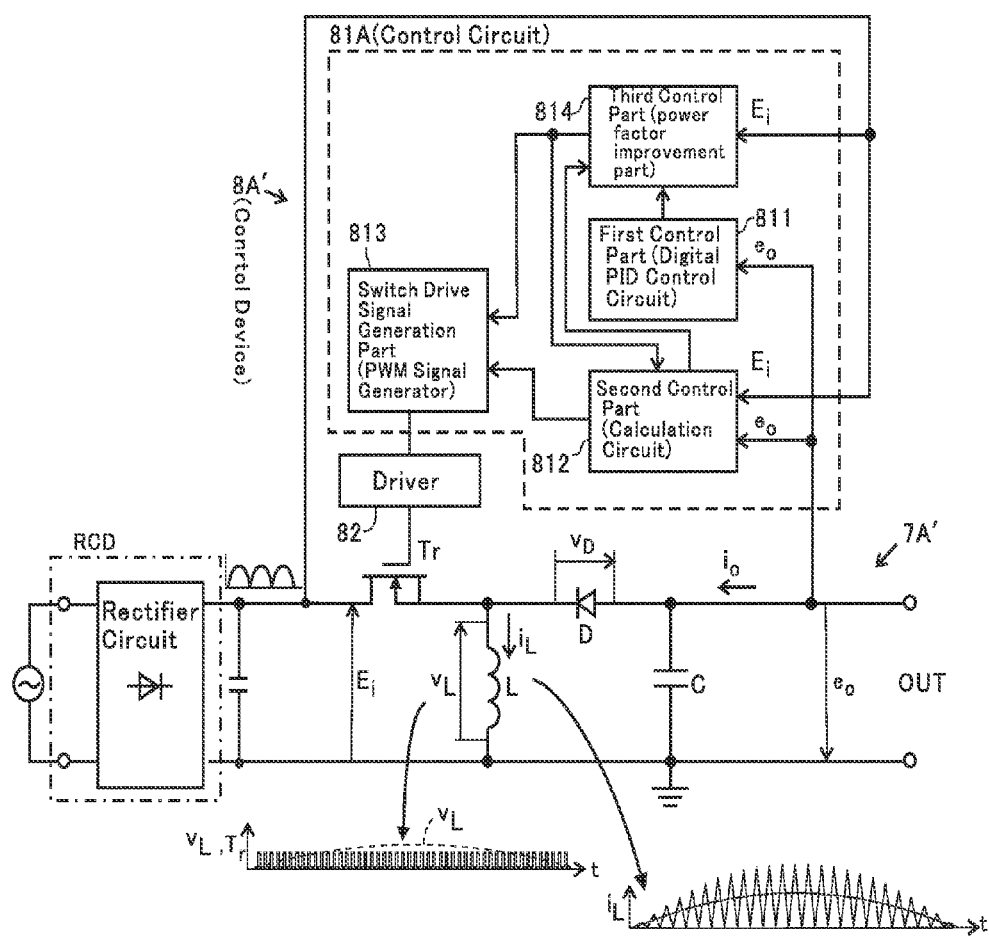
FIG. 18 is a diagram which shows one embodiment of the control device (a control device for an AC/DC converter) of the present invention comprising a third control part.

FIG. 18 is a diagram which shows one embodiment of the control device (a control device for an AC/DC converter) of the present invention comprising a third control part.

In FIG. 18, an AC/DC converter 7A' is controlled by a control device 8A'.

The AC/DC converter 7A' of FIG. 18 is comprised of a rectifying circuit RCD inputting electric power and a converter inputting the rectification output of rectifying circuit RCD.

The converter consists of a transistor switch Tr, a reactor L, a diode D and a capacitor C.

The rectifying circuit RCD is connected to one side terminal of the transistor switch Tr.

The other terminal of the transistor switch Tr is connected to one side terminal of the reactor L and a cathode of the diode D.

Another terminal of the reactor L is grounded.

An anode of the diode D is connected to one side terminal of the capacitor C and the load R.

The output terminal (OUT) of the AC/DC converter 7' can be connected to an input terminal of the DC/DC converter 1 which illustrated by FIG. 1 (not shown).

The output terminal (OUT) of the AC/DC converter 7' can be connected to an input terminal of the DC/DC converter 3 which illustrated by FIG. 2 (not shown).

The output terminal (OUT) of the AC/DC converter 7' can be connected to an input terminal of the DC/DC converter 5 which illustrated by FIG. 3 (not shown).

Also, the output terminal of the AC/DC converter 7' can be connected to the load R (not shown).

The control device 8A' consists of a control circuit 81 and a driver 82.

The control circuit 81 (a digital PID control circuit) is composed of a first control part 811 (a digital PID control circuit), a second control part 812, a switch drive signal generation part 813 (an operation circuit) and a third control part 814.

Figure 19:
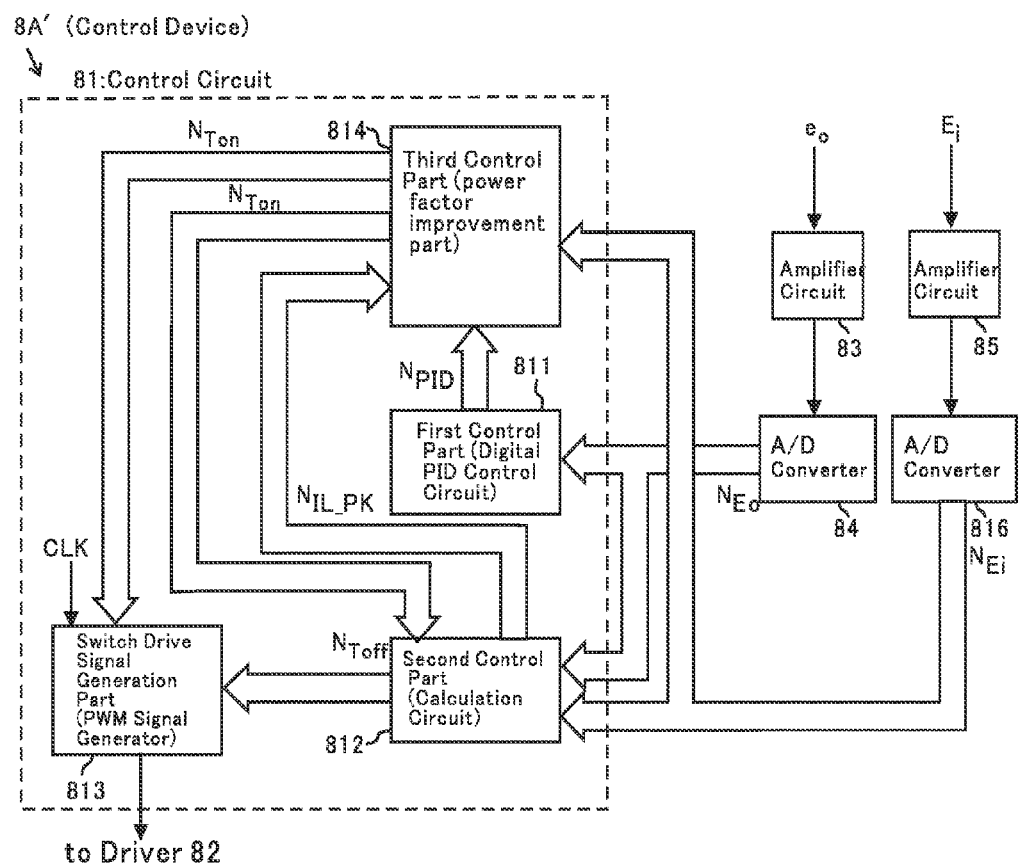
FIG. 19 is a detailed explanatory diagram of the control device of the AC/DC converter shown in FIG. 18.

FIG. 19 is a detailed explanatory diagram of a control device 8A' of the AC/DC converter shown in FIG. 18.

The output voltage eo of the AC/DC converter 7A' is amplified by an amplification circuit 83.

An output voltage $e_o$ is converted into a digital signal ($N_{eo}$) by an A/D converter 84.

The digital signal ($N_{eo}$) is input into a first control part 811 and a second control part 812.

An input voltage $E_i$ of an AC/DC converter 7A' is amplified by an amplification circuit 85.

An amplified input voltage $E_i$ is converted into a digital signal ($N_{Ei}$) by an A/D converter 86.

The digital signal ($N_{Ei}$) is input into a second control part 812 and the third control part 814.

A first control part 811 calculates a PID control quantity as a turn-off timing basic value ($N_{PID}$) based on an input detected value (a digital signal $N_{eo}$).

This turn-off timing basic value is sent to the third control part 814.

Third control part 814 generates an on-time signal $N_{Ton}$ based on a detected value (a digital signal $N_{Ei}$) of an input voltage E a turn-off timing basic value ($N_{PID}$), a peak value $i_{L\_pk}$ of a reactor current $i_L$ input from the second control part 812.

The detected value in the last time or the switching period previous than it can be adopted is used as $i_{L\_pk}$.

Third control part 814 sends a peak value $i_{L\_pk}$ to a switch drive signal generation part 813 and second control part 812.

The second control part 812 calculates a peak value $i_{L\_pk}$ (a digital signal $N_{Ei}$) of a reactor current $i_L$, based on a detected value of an input voltage $E_i$ and an "on-status retention time" ($N_{Ton}$) received from the third control part 814.

The second control part 812 calculates the time (off time $N_{Toff}$) that reactor current $i_L$ becomes to predetermined value from a peak value $i_{L\_pk}$ defined as an initial value.

This calculation result is sent to the switch drive signal generation part 813.

The switch drive signal generation part 813 generates the PWM signal based on "on-time signal" $N_{Ton}$ received from the third control part 814.

This PWM signal is sent to driver 82.

The switch drive signal generation part 813 generates the PWM signal based on "off time" $N_{Toff}$ received from the second control part 812.

This PWM signal is sent to driver 82.

A procedure of the derivation of the turn-off timing by control device 8A' is shown below.

(a)

The first control part 811 calculates a PDI control quantity $N_{PID}$ from the digital signal $N_{Eo}$.

(b)

The second control part 812 calculates a peak value $N_{iL\_PK}$ using the above-mentioned a differential equation (1).

(c)

The third control part 814 calculates an on-time $N_{Eo}$ (a turn-off timing) by using a following equation.

$$N_{Ton} = N_B + K(N_{iL\_PK} - N_{Ei} \times N_{PID})$$

A procedure of the derivation of the turn-on timing by a control device 8A' is shown below.

(d)

The second control part 812 receives an information of NTon from the third control part 814.

Also, the second control part 812 receives the digital signals NEi, NEo.

(e)

The second control part 812 calculates the off-time NToff (the turn-on timing) by the above-mentioned differential equation which assumes peak value $Ni_L\_PK$ an initial value.

The differential equation is the second differential equation formulas (3) in the present invention).

In the control device 8A', a power factor improvement is performed by adjusting the turn-off timing.

In the control device 8A', a current critical mode control is performed by adjusting the turn-on timing.

Figure 20:
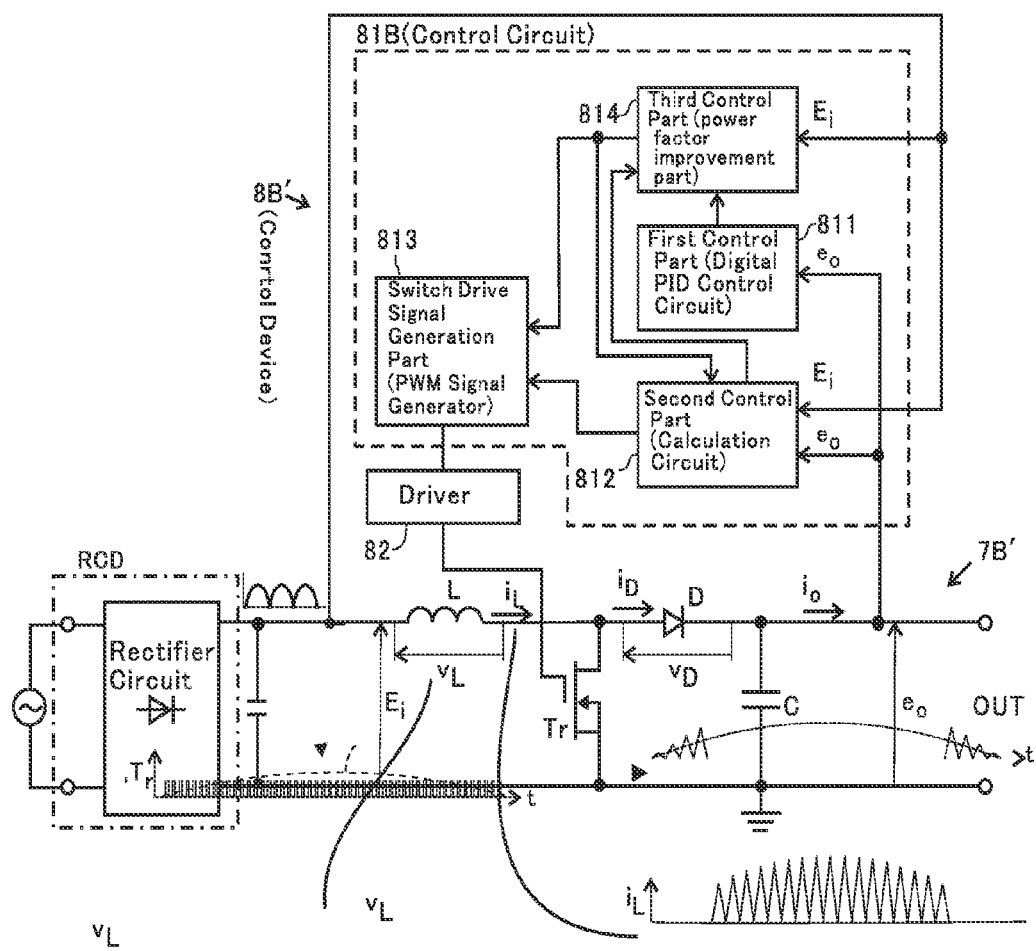
FIG. 20 is a diagram which shows another embodiment of the control device (a control device for an AC/DC converter) of the present invention comprising a third control part.
Figure 21:
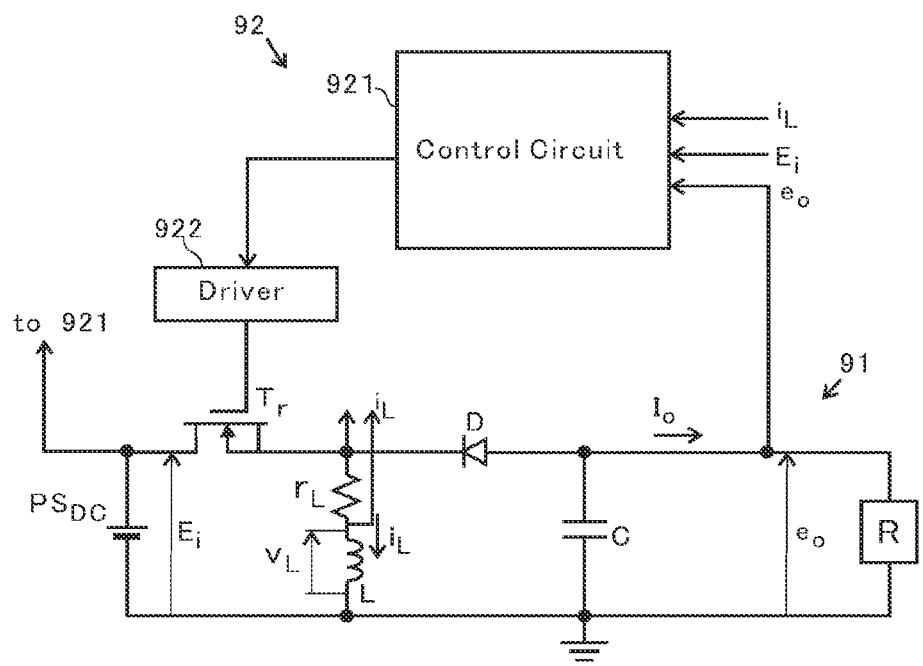
FIG. 21 is a prior art explanatory diagram.
Figure 21:
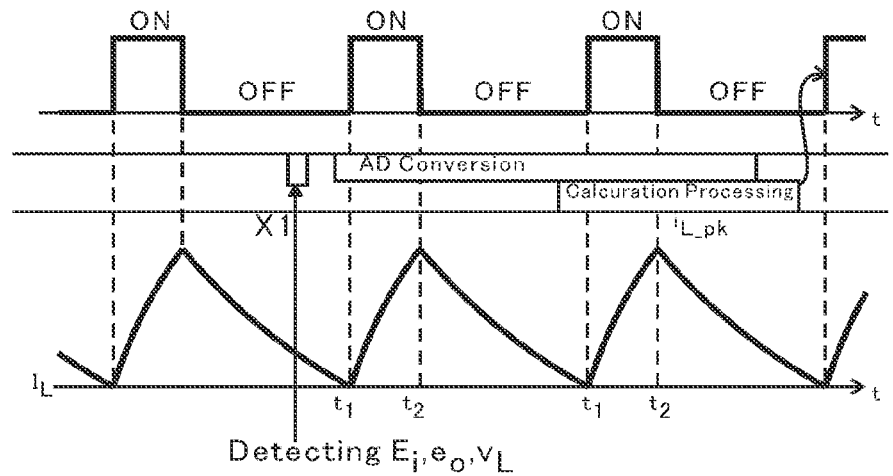
Figure 22:
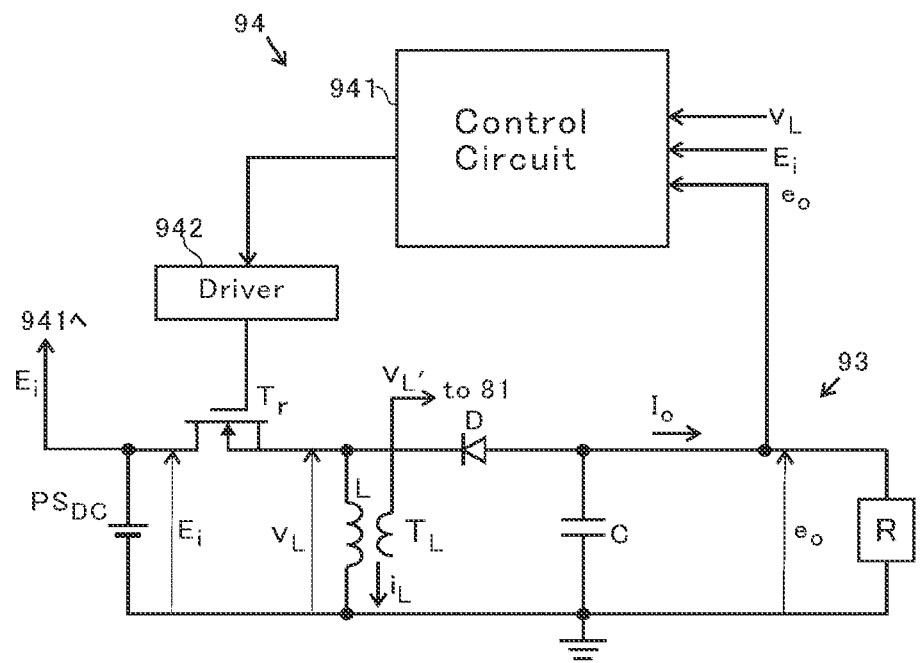
FIG. 22 is a prior art explanatory diagram.
Figure 22:
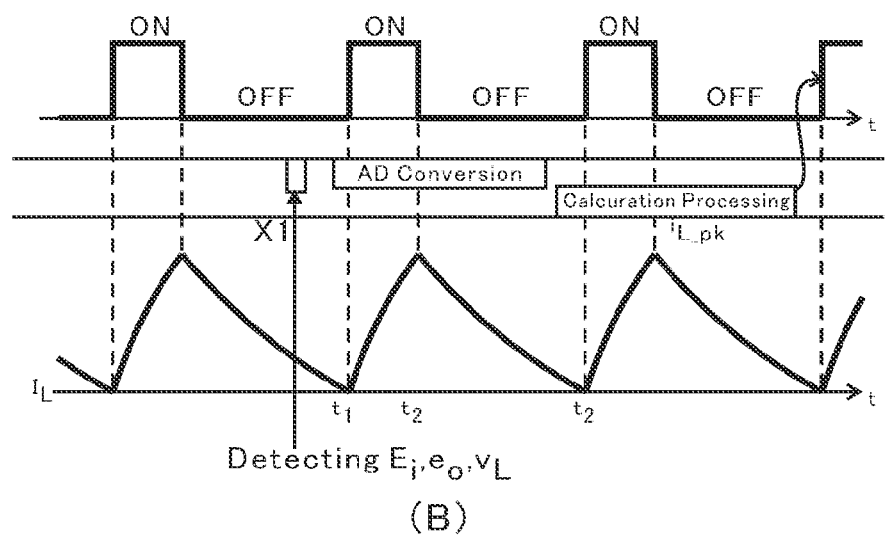
Figure 23:
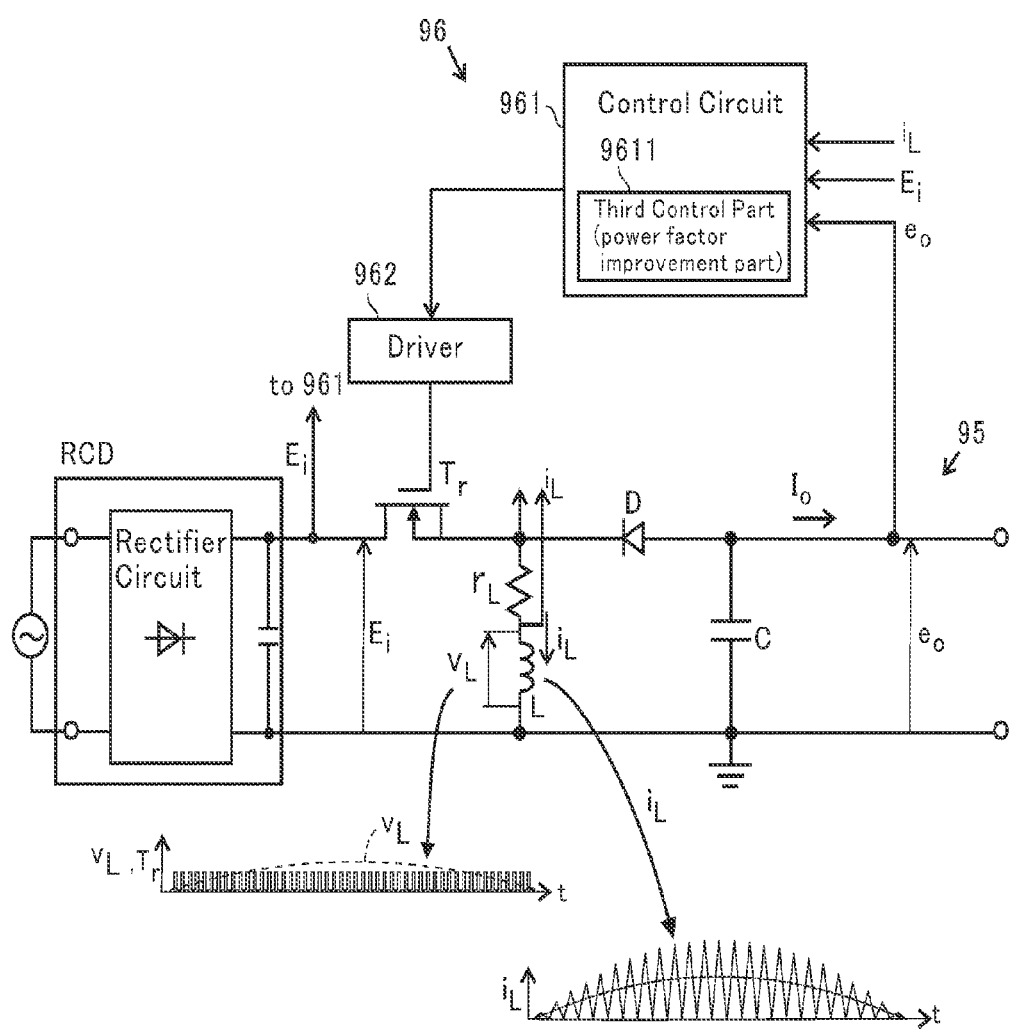
FIG. 23 is a diagram showing a power converter circuit (an AC/DC converter) of a conventional step-up and -down type comprising a third control part.

FIG. 20 is a diagram showing another embodiment of the control device for the power converter circuit (an AC/DC converter controlled by a third control part) of the present invention.

In FIG. 20, the switching power supply of the AC/DC converter 7B' comprises a converter of a step-up type.

A constitution and an operation of a control device 8B' are the same the constitution and the operation of the control device 8A' of FIGS. 18 and 19.

DENOTATION OF REFERENCE NUMERALS 1, 3, 5: a DC/DC converter
7, 7A, 7A': an AC/DC converter
2, 4, 6, 8, 8B, 8B': control device
21, 41,61,81: control circuit
22, 42, 62, 82: driver
23, 25, 83, 85: amplification circuit
24, 26, 84, 86: A/D converter
211,411,611,811: first control part
212,412,612,812: second control part
213,413,613,813: switch drive signal generation part
814: third control part

The invention claimed is:

1. A control device of a power converter circuit having a DC/DC converter comprising a first control part, a second control part and a switch drive signal generation part:
wherein the first control part inputs a detected value of at least an output voltage,
calculates a turn-off timing predicted value of a switch of the DC/DC converter based on the detected values, and sends a result of the calculation to a switch drive signal generation part;
the second control part inputs the output voltage and a detected value of an input voltage at least, and receives a turn-off timing predicted value from the first control part,
calculates a peak value of a reactor current of the DC/DC converter based on the detected values and the turn-off timing predicted value,
calculates a time when the reactor current decreases to a predetermined preset value (the time when addition time was added: a turn-on timing predicted value) as the initial value,
sends a result of the calculation to the switch drive signal generation part;
the switch drive signal generation part receives the turn-off timing predicted value from the first control part and turns off the switch when the time reached the turn-off timing predicted value.

2. The control device of a power converter circuit according to claim 1:
wherein the second control part calculates the peak value of the reactor current as an initial value with a bottom value of the reactor current just before that (for example, before one switching period).

3. The control device of a power converter circuit according to claim 1:
wherein the second control part calculates the turn-on timing predicted value as zero with a predetermined preset value of the reactor current.

4. The control device of a power converter circuit according to claim 1, wherein the second control part makes a first differential equation demanding the peak value of the above reactor current based on an equivalent circuit according to operation statuses representing an on-status or an off-status of the switch and the diode, and detects the peak value (a turn-off timing in a current critical mode, that is an on-time) of the reactor current by solving the first differential equation,
the second control part makes a second differential equation to demand the time when the reactor current reaches the preset value, and detects the time when the reactor current reaches a predetermined preset value (a turn-off timing in a current critical mode (a zero cross point), that is an off-time) by solving the second differential equation.

5. The control device of a power converter circuit according to claim 4:
wherein the first differential equation is made by an equivalent circuit which the operation status of the switch is "on-status" and the operation status of the diode is "off-status".

6. The control device of a power converter circuit according to claim 1:
wherein,
when the power converter circuit is a step-up and -down type,
the first differential equation is made based on follow equations, $T_{on}=t_2-t_1$, $E_i-v_{Tr}=L(di_L/dt)+r_L i_L$, $e_o=e_c\cdot R/(R+r_c)$, $e_c/(R+r_c)=-C\cdot(de_c/dt)$, $E_i^*=E_i-v_{Tr}$, the second differential equation is made based on follow equations, $T_{off}=t_3-t_2$, $-v_D=L(di_L/dt)+r_L i_L+e_o$, $i_{L1}=C\cdot(de_c/dt)$, $e_o=e_c+r_c i_{L1}$, $e_o=Ri_{L2}$, $i_L=i_{L1}+i_{L2}$, $e_o=e_c\cdot R/(R+r_c)+i_L\cdot R\cdot r_c/(R+r_c)$, when the power converter circuit is a step-down type,
the first differential equation is made based on follow equations, $T_{on}=t_2-t_1$, $E_i-v_{Tr}=L(di_L/dt)+r_L i_L+e_o$, $e_o=e_c\cdot R/(R+r_c)$, $e_c/(R+r_c) = -C \cdot (de_c/dt)$, $E_i^* = E_i - v_{Tr}$, the second differential equation is made based on follow equations, $T_{off} = t_3 - t_2$, $-v_D = L(di_L/dt) + r_L i_L + e_o$, $i_{L1} = C \cdot (de_c/dt)$, $e_o = e_c + r_c i_{L1}$, $e_o = R i_{L2}$, $i_L = i_{L1} + i_{L2}$, $e_o = e_c \cdot R/(R+r_c) + i_L \cdot R \cdot r_c/(R+r_c)$, when the power converter circuit is a step-up type,
the first differential equation is made based on follow equations, $T_{on} = t_2 - t_1$, $E_i - v_{Tr} = L(di_L/dt) + r_L i_L$, $e_o = e_c \cdot R/(R+r_c)$, $e_c/(R+r_c) = -C \cdot (de_c/dt)$, $E_i^* = E_i - v_{Tr}$, the second differential equation is made based on follow equations, $T_{off} = t_3 - t_2$, $E_i - v_D = L(di_L/dt) + r_L i_L + e_o$, $i_{L1} = C \cdot (de_c/dt)$, $e_o = e_c + r_c i_{L1}$, $e_o = R i_{L2}$, $i_L = i_{L1} + i_{L2}$;

wherein,
$T_{on}(=t_2-t_1)$ ... on-time of the switch
$T_{off}(=t_3-t_2)$ ... off-time of the switch
$E_i$ ... an input voltage
$E_i^*$ ... a mean value of the input voltage
$v_{Tr}$ ... a voltage descent under "on-status" of the transistor
$v_D$ ... a voltage descent of a diode
$i_L$ ... a reactor current
$i_{L1}$ ... a current flowing for a reactor from a capacitor:
$i_{L2}$ ... a current flowing for a reactor from a load
$e_o$ ... a output voltage
$e_c$ ... a capacitor voltage
R ... a load resistor
$r_L$ ... a reactor resistance
$r_c$ ... a capacitor resistance
C ... a capacitor.

7. A control device for a power converter circuit consists of a rectifying circuit which rectifies AC power and a switching power supply which converts the rectified voltage to into a DC voltage, wherein the control device comprises a first control part and a second control part:

wherein the first control part inputs a detected value of at least an output voltage of the switching power supply, calculates a turn-off timing predicted value of a switch of the switching power supply based on the detected values to improve a power factor of the switching power supply;

the second control part receives an input voltage and a turn-off timing predicted value at least, the second control part calculates a peak value of a reactor current of the power converter circuit, and calculates a turn-on timing predictive value (wherein a turn-on timing predictive value is a time or a time that an additional time is added when a reactor current decreases to a predetermined preset value from a peak value defined as an initial value).

8. A control device for a power converter circuit consists of a rectifying circuit which rectifies AC power and a switching power supply which converts the rectified voltage to into a DC voltage, wherein the control device comprises a first control part and a second control part:

wherein the first control part inputs a detected value of at least an output voltage of the power converter circuit, and calculates a turn-off timing basic value of the switch of the switching power supply;

the second control part inputs at least an input voltage of the power converter circuit and receives a turn-off timing predicted value, calculates a peak value of a reactor current of the power converter circuit, calculates a turn-on timing predictive value (wherein a turn-on timing predictive value is a time or a time that an additional time is added when a reactor current decreases to a predetermined preset value from a peak value defined as an initial value);

the third control part inputs at least the turn-off timing basic value, calculates the turn-off timing predicted value that the correction quantity for power factor improvement is added to the turn-off timing basic value; and the switch drive signal generation part receives the turn-off timing predicted value from the first control part, turns off the switch when a counted time reached the turn-off timing predicted value, receives the turn-on timing predicted value from the second control part, turns on the switch when a counted time reached the turn-on timing predicted value.

9. The control device of a power converter circuit according to claim 8:

wherein the turn-off timing basic value is a proportion control quantity, a differential control quantity, an integral control quantity or a control quantity which at least two were put together thereof.

10. The control device of a power converter circuit according to claim 8:

wherein the second control part calculates the peak value of the reactor current as an initial value with a bottom value of the reactor current just before that (for example, before one switching period).

11. The control device of a power converter circuit according to claim 8:

wherein the second control part calculates the turn-on timing predicted value as zero with a predetermined preset value of the reactor current.

12. The control device of a power converter circuit according to claim 8, wherein the second control part makes a first differential equation demanding the peak value of the above reactor current based on an equivalent circuit according to operation statuses representing an on-status or an off-status of the switch and the diode, and detects the peak value of the reactor current by solving the first differential equation, the second control part makes a second differential equation to demand the time when the reactor current reaches the preset value, and detects the time when the reactor current reaches a predetermined preset value (a turn-off timing in a current critical mode by solving the second differential equation).

13. The control device of a power converter circuit according to claim 2:
    wherein the second control part calculates the turn-on timing predicted value as zero with a predetermined preset value of the reactor current.

14. The control device of a power converter circuit according to claim 9:
    wherein the second control part calculates the peak value of the reactor current as an initial value with a bottom value of the reactor current just before that (for example, before one switching period).

15. The control device of a power converter circuit according to claim 9:
    wherein the second control part calculates the turn-on timing predicted value as zero with a predetermined preset value of the reactor current.

16. The control device of a power converter circuit according to claim 10:
    wherein the second control part calculates the turn-on timing predicted value as zero with a predetermined preset value of the reactor current.

* * * * *